US008724616B2

(12) United States Patent
Seyama et al.

(10) Patent No.: US 8,724,616 B2
(45) Date of Patent: May 13, 2014

(54) COMMUNICATION APPARATUS, MOBILE STATION, AND COMMUNICATION CONTROL METHOD

(75) Inventors: Takashi Seyama, Kawasaki (JP); Takashi Dateki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 235 days.

(21) Appl. No.: 13/167,091

(22) Filed: Jun. 23, 2011

(65) Prior Publication Data

US 2011/0249665 A1 Oct. 13, 2011

Related U.S. Application Data

(63) Continuation of application No. PCT/JP2009/050009, filed on Jan. 5, 2009.

(51) Int. Cl.
*H04J 3/06* (2006.01)

(52) U.S. Cl.
USPC ......................................................... 370/350

(58) Field of Classification Search
None
See application file for complete search history.

(56) References Cited

U.S. PATENT DOCUMENTS

| 2006/0056462 | A1  | 3/2006 | Miyoshi |
| 2008/0219148 | A1* | 9/2008 | Li et al. ......................... 370/210 |
| 2010/0046445 | A1  | 2/2010 | Sawahashi et al. |
| 2010/0054191 | A1  | 3/2010 | Higuchi et al. |
| 2010/0098009 | A1* | 4/2010 | Higuchi ........................ 370/329 |
| 2010/0208720 | A1* | 8/2010 | Fujishima et al. ............ 370/350 |

FOREIGN PATENT DOCUMENTS

| CN | 1649422     | 8/2005  |
| CN | 101313621   | 11/2008 |
| EP | 1 598 970   | 11/2005 |
| EP | 1 944 882   | 7/2008  |
| EP | 1 976 148   | 10/2008 |
| EP | 2 056 506   | 5/2009  |
| EP | 2 129 027   | 12/2009 |
| JP | 2004-266350 | 9/2004  |
| JP | 2007-221746 | 8/2007  |
| JP | 2007-228547 | 9/2007  |
| JP | 2008-079262 | 4/2008  |
| JP | 2008-236428 | 10/2008 |
| WO | 2007/038550 | 4/2007  |
| WO | 2007/052576 | 5/2007  |

OTHER PUBLICATIONS

3GPP TS 36.211 V8.4.0; 3rd Generation Partnership Project; Technical Specification Group Radio Access Network; Evolved Universal Terrestrial Radio Access (E-UTRA); Physical Channels and Modulation (Release 8); Dated Sep. 2008.

(Continued)

*Primary Examiner* — Chi Pham
*Assistant Examiner* — Raul Rivas
(74) *Attorney, Agent, or Firm* — Myers Wolin, LLC

(57) ABSTRACT

A radio communication system including a communication apparatus can transmit signals each including same data from a transmission antenna and a transmission antenna to a mobile station. The mobile station measures a difference in receiving timing between the signal from the transmission antenna and the signal from the transmission antenna. The communication apparatus exercises control so as to change at least one of transmission timing of the signal from the transmission antenna and transmission timing of the signal from the transmission antenna according to the difference in receiving timing at the mobile station.

11 Claims, 16 Drawing Sheets

(56) References Cited

OTHER PUBLICATIONS

3GPP TS 36.212 V8.4.0; 3rd Generation Partnership Project; Technical Specification Group Radio Access Network; Evolved Universal Terrestrial Radio Access (E-UTRA); Multiplexing and channel coding (Release 8); Dated Sep. 2008.

3GPP TS 36.232 V8.4.0; 3rd Generation Partnership Project; Technical Specification Group Radio Access Network; Evolved Universal Terrestrial Radio Access (E-UTRA); Physical layer procedures (Release 8); Dated Sep. 2008.

3GPP TS 36.214 V8.4.0; 3rd Generation Partnership Project; Technical Specification Group Radio Access Network; Evolved Universal Terrestrial Radio Access (E-UTRA); Physical layer—Measurements (Release 8); Dated Sep. 2008.

3GPP TR 36.814 V0.1.1; 3rd Generation Partnership Project; Technical Specification Group Radio Access Network; Further Advancements for E-UTRA; Physical Layer Aspects (Release X); Dated Sep. 2008.

Fujitsu; "Efficinet HARQ Protocol for SIC based DL CoMP"; R1-084294; 3GPP TSG-RAN1 #55; Prague, Czech Republic, Nov. 10-14, 2008.

Samsung; "Further discussion on Inter-Cell Interference mitigation through Limited Coordination"; R1-083569; 3GPP TSG RAN WG1 #54bis; Prague, Czech Republic, Sep. 29-Oct. 3, 2008.

Ericsson; "Downlink coordinated transmission—Impact on specification"; R1-083931; TSG-RAN WG1 #54bis; Prague, Czech Republic, Sep. 20-Oct. 3, 2008.

NTT Docomo; "Application of Remote Radio Equipment to LTE-Advanced"; R1-084254; 3GPP TSG RAN WG1 #55; Prague, Czech Republic, Nov. 10-14, 2008 (Original R1-083688).

Nortel; "Discussion and Link Level Simulation Results on LTE-A Downlink Multi-site MIMO Cooperation"; R1-084465; 3GPP TSG-RAN Working Group 1 Meeting #55; Prague, Czech Republic, Nov. 10-14, 2008.

3GPP TS 36.213 V8.4.0; 3rd Generation Partnership Project; Technical Specification Group Radio Access Network; Evolved Universal Terrestrial Radio Access (E-UTRA); Physical layer procedures (Release 8); Dated Sep. 2008.

International Search Report issued for corresponding International Patent Application No. PCT/JP2009/050009, mailed Apr. 14, 2009.

First Notification of Office Action issued for corresponding Chinese Patent Application No. 200980153377.8 issued May 30, 2013, with full English translation.

Second Notification of Office Action issued by the State Intellectual Property Office of China for corresponding Chinese patent application No. 200980153377.8, issued Oct. 28, 2013, with English translation.

* cited by examiner

FIG. 7

$$W_0 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$
(000)

$$W_1 = \begin{bmatrix} 0.3780 & -0.2698 + j\,0.5668 & 0.5957 - j\,0.1578 & 0.1587 + j\,0.2411 \\ -0.2698 - j\,0.5668 & 0.3665 & 0.4022 + j\,0.4743 & -0.1509 + j\,0.2492 \\ 0.5957 + j\,0.1578 & 0.4022 - j\,0.4743 & 0.3804 & -0.0908 - j\,0.2721 \\ 0.1587 - j\,0.2411 & -0.1509 - j\,0.2492 & -0.0908 + j\,0.2721 & 0.8660 \end{bmatrix}$$
(001)

⋮

$$W_7 = \begin{bmatrix} 0.3780 & 0.0618 + j\,0.3332 & -0.3456 - j\,0.5029 & -0.5704 - j\,0.2113 \\ 0.0618 - j\,0.3332 & 0.8154 & 0.3037 - j\,0.1352 & 0.1698 - j\,0.2845 \\ -0.3456 + j\,0.5029 & 0.3037 + j\,0.1352 & 0.4015 & -0.4877 + j\,0.3437 \\ -0.5704 + j\,0.2113 & 0.1698 + j\,0.2845 & -0.4877 - j\,0.3437 & 0.4052 \end{bmatrix}$$
(111)

COMMUNICATION APPARATUS, MOBILE STATION, AND COMMUNICATION CONTROL METHOD

This is a continuation Application PCT/JP2009/050009, filed on Jan. 5, 2009, now pending, the contents of which are herein wholly incorporated by reference.

FIELD

The embodiments discussed herein are related to a communication apparatus, a mobile station, and a communication control method for radio communication.

BACKGROUND

At present radio communication systems such as mobile phone systems and wireless LANs (Local Area Networks) are widely used. With radio communication a transmission apparatus performs error-correction encoding and modulation on data, maps a modulated signal obtained to a radio resource in a physical layer, and transmits it. A receiving apparatus extracts the signal mapped to the radio resource, performs demodulation and error-correction decoding on the signal, and reproduces the data. With 3GPP (3rd Generation Partnership Project), for example, specifications in the physical layer of a mobile phone system are discussed.

A MIMO (Multiple Input Multiple Output) technique in which a plurality of antennas are used for transmitting and receiving radio signals may be used in a radio communication system. With MIMO the phases of signals transmitted from the plurality of antennas can be adjusted (precoding) according to communication channel fluctuation. For example, a possible method is to select a precoding matrix corresponding to communication channel fluctuation from a set of precoding matrices (code book) in which a phase adjustment amount is defined and to apply it to a signal to be transmitted.

In addition, with a radio communication system a CoMP (Coordinated Multiple Point) transmission technique in which a plurality of transmission apparatus transmit the same data in cooperation with one another is discussed. A receiving apparatus can improve receiving quality by combining received signals each including the same data. CoMP transmission may be performed, for example, in the case where a receiving apparatus measures the receiving power of a signal transmitted from each transmission apparatus and where the difference between the strongest receiving power and the second strongest receiving power is smaller than or equal to a threshold. Furthermore, the CoMP transmission may be performed in the case where the SINR (Signal to Interference and Noise Ratio) of a signal the receiving power of which is strongest is smaller than or equal to a threshold assuming single point transmission.

With the CoMP transmission each transmission apparatus may transmit not only a RS (Reference Signal) specific thereto but also a RS specific to a receiving apparatus in order to make channel estimation of combined signals easy. In addition, the precoding technique may be used in the CoMP transmission.

Moreover, a communication apparatus for performing scheduling of data transmission and a radio transmission apparatus for performing radio processing may be used as two different apparatuses.

SUMMARY

According to an aspect of the invention, there is provided a communication apparatus which transmits signals each including same data from a plurality of transmission antennas to a mobile station, the communication apparatus including: a receiver which acquires information indicative of a difference in receiving timing at the mobile station between a signal from a first transmission antenna and a signal from a second transmission antenna; and a processor which controls so as to change at least one of transmission timing of the signal from the first transmission antenna and transmission timing of the signal from the second transmission antenna according to the difference in receiving timing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is an example of a precoding matrix;

DESCRIPTION OF EMBODIMENTS

It is assumed that there is a radio communication system in which signals each including the same data can be transmitted from a plurality of transmission antennas to a mobile station. Even when the signals are transmitted from the plurality of transmission antennas at the same time in this radio communication system, there are many cases where a receiving timing difference arises at the mobile station. With an increase in the distance between the plurality of transmission antennas, a receiving timing difference at the mobile station becomes larger. In addition, when the mobile station moves, a receiving timing difference fluctuates. Such a receiving timing difference causes a deterioration in receiving quality at the mobile station.

For example, if a preceding signal and a delayed signal the contents of which are the same as those of the preceding signal and a delay amount of which is large overlap, it seems to the mobile station that a channel fluctuation is very significant in the frequency domain. If a channel fluctuation is significant in the frequency domain, it is not easy for the mobile station to accurately estimate a channel estimation value in the frequency domain. In addition, if the precoding technique is applied to the plurality of transmission antennas and proper phase adjustment amounts differ between a frequency and its nearby frequency, it is not easy to select a proper precoding matrix. That is to say, it is impossible to make use of the function of channel estimation at receiver, phase adjustment at transmitter, or the like. As a result, receiving quality cannot be improved.

The present invention was made to solve the above problems. An object of the present invention is to provide a communication apparatus, a mobile station, and a communication control method which can improve receiving quality in the case of receiving signals each including the same data from a plurality of transmission antennas.

Embodiments will now be described in detail with reference to the drawings.

Figure 1:
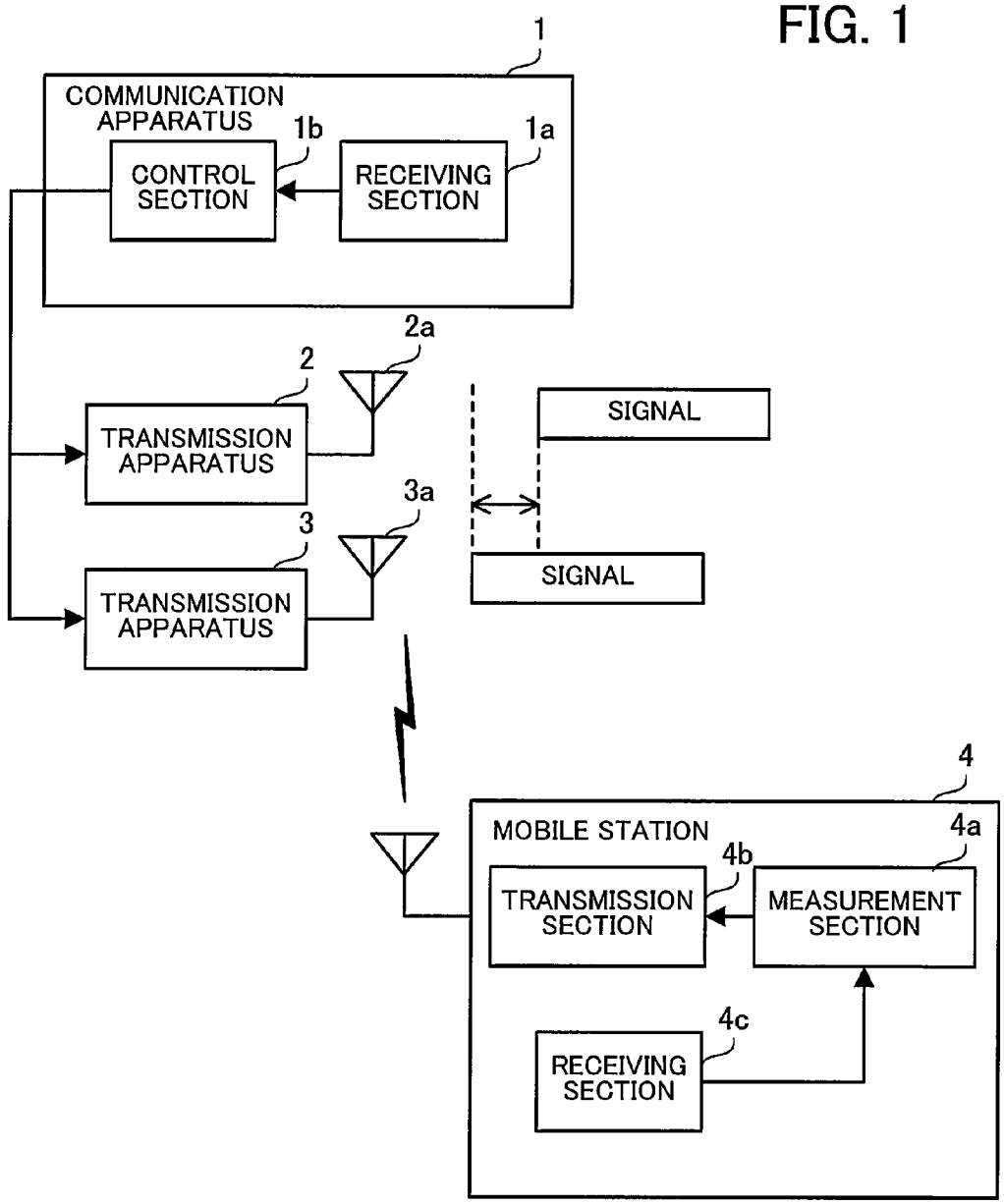
FIG. 1 is an example of a communication apparatus and a mobile station.

FIG. 1 is an example of a communication apparatus and a mobile station. A communication apparatus 1 can exercise control so as to transmit signals each including the same data from transmission antennas 2a and 3a to a mobile station 4. For example, the communication apparatus 1 designates for a transmission apparatus 2 including the transmission antenna 2a and a transmission apparatus 3 including the transmission antenna 3a timings at which the signals each including the same data are transmitted. However, one or both of the transmission apparatus 2 and 3 may be integrated with the communication apparatus 1. The mobile station 4 can receive the signals from the transmission antennas 2a and 3a.

The communication apparatus 1 includes a receiving section 1a and a control section 1b. The receiving section 1a acquires information indicative of the difference between timing at which the mobile station 4 receives the signal from the transmission antenna 2a and timing at which the mobile station 4 receives the signal from the transmission antenna 3a. The receiving section 1a may directly receive the information indicative of the receiving timing difference from the mobile station 4 by radio or acquire the information indicative of the receiving timing difference via a receiving apparatus other than the communication apparatus 1. The control section 1b, which may be realized by using a processor, e.g., Central Processing Unit (CPU), exercises control so as to change at least one of the timing at which the transmission antenna 2a transmits the signal and the timing at which the transmission antenna 3a transmits the signal according to the receiving timing difference of which the mobile station 4 informs the communication apparatus 1.

For example, if the signal from the transmission antenna 3a reaches the mobile station 4 after the signal from the transmission antenna 2a, then the control section 1b may make the timing at which the transmission antenna 3a transmits the signal earlier by the receiving timing difference of which the mobile station 4 informs the communication apparatus 1. Conversely, the control section 1b may make the timing at which the transmission antenna 2a transmits the signal later by the receiving timing difference of which the mobile station 4 informs the communication apparatus 1. The control section 1b may change both of the timing at which the transmission antenna 2a transmits the signal and the timing at which the transmission antenna 3a transmits the signal. In addition, the amount of one change may be limited. That is to say, the receiving timing difference of which the mobile station 4 informs the communication apparatus 1 may not be compensated for at a time.

The transmission apparatus 2 or 3 changes the timing at which it outputs the signal from the transmission antenna 2a or 3a under the control of the control section 1b. For example, the transmission apparatus 2 or 3 can change transmission timing by rotating a phase on a frequency domain. Furthermore, the transmission apparatus 2 or 3 can change transmission timing by phase-rotating the signal in a determined signal interval on a time domain. If the transmission apparatus 2 or 3 is not integrated with the communication apparatus 1, each of the transmission apparatus 2 and 3 may perform only a radio transmission process. That is to say, the communication apparatus 1 may perform a transmission timing change process.

The mobile station 4 includes a measurement section 4a, a transmission section 4b, and a receiving section 4c. The measurement section 4a, which may be realized by using a processor, e.g., CPU, measures the difference between the timing at which the mobile station 4 receives the signal from the transmission antenna 2a and the timing at which the mobile station 4 receives the signal from the transmission antenna 3a. At this time the measurement section 4a uses, for example, a known signal received by the receiving section 4c. The transmission section 4b informs the communication apparatus 1 of the information indicative of the receiving timing difference measured by the measurement section 4a. For example, the transmission section 4b transmits a bit string (such as an index) with determined bit length associated with the receiving timing difference. The receiving section 4c combines and demodulates signals from the transmission antennas 2a and 3a.

Transmission antennas used as reference by the measurement section 4a for determining a receiving timing difference may be predetermined or be selected on the basis of an index such as receiving power. In the latter case, the transmission section 4b may inform the communication apparatus 1 of information indicative of reference transmission antennas. Furthermore, only if the receiving timing difference exceeds a determined threshold, the transmission section 4b may inform the communication apparatus 1 of the receiving timing difference. If the precoding technique is used, the measurement section 4a can select precoding matrices applied to the transmission antennas 2a and 3a with the amount of a change in transmission timing taken into consideration.

According to the above communication apparatus 1, the receiving section 1a acquires information indicative of the difference between timing at which the mobile station 4 receives a signal from the transmission antenna 2a and timing at which the mobile station 4 receives a signal from the transmission antenna 3a. The control section 1b exercises control so as to change at least one of timing at which the transmission antenna 2a transmits the signal and timing at which the transmission antenna 3a transmits the signal according to the receiving timing difference. In addition, according to the above mobile station 4, the measurement section 4a measures the difference between the timing at which the mobile station 4 receives the signal from the transmission antenna 2a and the timing at which the mobile station 4 receives the signal from the transmission antenna 3a. The transmission section 4b transmits information indicative of the receiving timing difference. After that, the receiving section 4c combines and demodulates signals from the transmission antennas 2a and 3a.

As a result, the difference between timing at which the mobile station 4 receives a signal from the transmission antenna 2a and timing at which the mobile station 4 receives a signal from the transmission antenna 3a is controlled. That is to say, the timing of transmission by each transmission antenna on the transmission side is adjusted so as to make receiving timings on the receiving side as close to one another as possible. This is effective especially in the case where there is a great distance between the transmission antennas 2a and 3a. This prevents very great channel fluctuations at the mobile station 4. As a result, channel estimation or precoding matrix selection can be performed with great accuracy. That is to say, communication quality is improved by a compensation process at receiving time or a compensation process at transmission time.

The above communication control method can be applied to cases where the number of transmission antennas is three or more. An example in which two radio base stations each including two transmission antennas are used for transmitting data to one mobile station, that is to say, in which four transmission antennas are used will now be described in further detail. In the following embodiments OFDM (Orthogonal Frequency Division Multiplexing) modulation is used when data is transmitted from a radio base station to a mobile station.

First Embodiment

Figure 2:
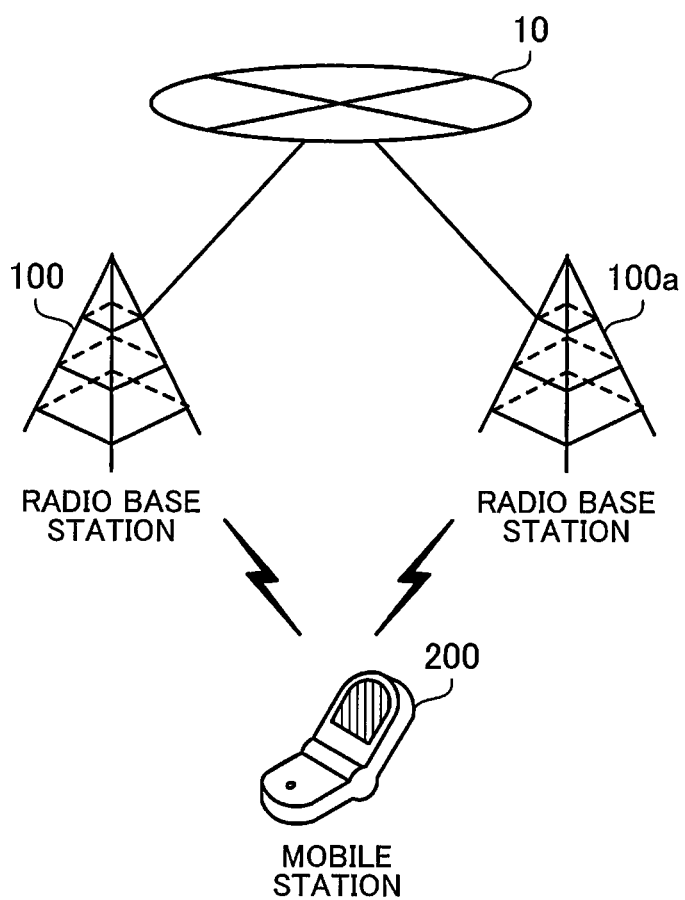
FIG. 2 illustrates the structure of a mobile telecommunication system according to a first embodiment.

FIG. 2 illustrates the structure of a mobile telecommunication system according to a first embodiment. A mobile telecommunication system according to a first embodiment includes radio base stations 100 and 100a and a mobile station 200. The radio base stations 100 and 100a are connected via a network 10.

Each of the radio base stations 100 and 100a is a radio communication apparatus which can perform radio communication with the mobile station 200. Each of the radio base stations 100 and 100a transmits user data and control information to the mobile station 200 via a downlink (radio link from the radio base station 100 or 100a to the mobile station 200). In addition, each of the radio base stations 100 and 100a receives via an uplink (radio link from the mobile station 200 to the radio base station 100 or 100a) user data and control information transmitted by the mobile station 200.

The mobile station 200 is a mobile radio terminal unit which can perform radio communication with the radio base stations 100 and 100a, and is, for example, a portable telephone. The mobile station 200 transmits the user data and the control information to the radio base station 100 or 100a via the uplink. In addition, the mobile station 200 receives via the downlink the user data and the control information transmitted thereto. In addition to the mobile station 200, a mobile station other than the mobile station 200 can perform radio communication with the radio base stations 100 and 100a.

The radio base stations 100 and 100a can transmit the same data to the mobile station 200 in cooperation with each other. The radio base station 100 or 100a controls the cooperative transmission. For example, if the mobile station 200 is currently communicating mainly with the radio base station 100 (serving base station), then the radio base station 100 may control the cooperative transmission. In this case, the radio base station 100 transfers data to be transmitted and transmits information regarding transmission timing designation, to the radio base station 100a via the network 10.

The mobile station 200 may determine whether to begin cooperative transmission. For example, the mobile station 200 compares the receiving power of a signal from the radio base station 100 with the receiving power of a signal from the radio base station 100a. If the difference between them is smaller than or equal to a determined threshold, then the mobile station 200 may make the determination that the radio base stations 100 and 100a should perform cooperative transmission. In addition, the mobile station 200 may measure the SINR of a signal the receiving power of which is higher. If the SINR is smaller than or equal to a determined threshold, then the mobile station 200 may make the determination that the radio base stations 100 and 100a should perform cooperative transmission.

Description will now be given with attention paid especially to control of communication via the downlink from the radio base station 100 or 100a to the mobile station 200. It is assumed that a current serving base station to the mobile station 200 is the radio base station 100 and that the radio base stations 100 and 100a perform cooperative transmission under the control of the radio base station 100.

Figure 3:
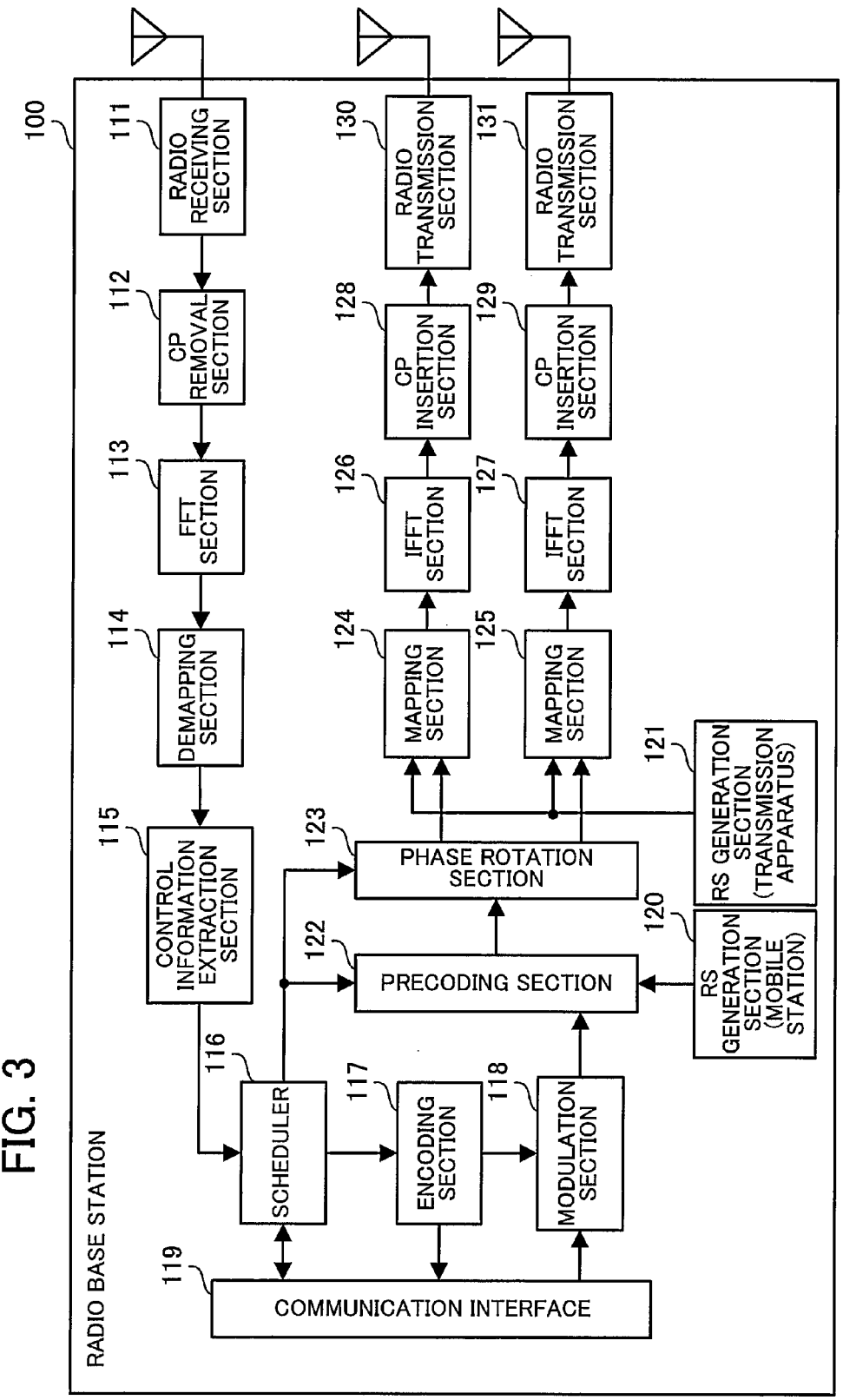
FIG. 3 is a block diagram of a radio base station according to the first embodiment.

FIG. 3 is a block diagram of a radio base station according to the first embodiment. The radio base station 100 includes a radio receiving section 111, a CP removal section 112, a FFT section 113, a demapping section 114, a control information extraction section 115, a scheduler 116, an encoding section 117, a modulation section 118, a communication interface 119, RS generation sections 120 and 121, a precoding section 122, a phase rotation section 123, mapping sections 124 and 125, IFFT sections 126 and 127, CP insertion sections 128 and 129, and radio transmission sections 130 and 131. The radio base station 100a can also be realized by the same structure that is adopted in the radio base station 100.

The radio receiving section 111 converts a radio signal received by a receiving antenna included in the radio base station 100 to a digital baseband signal. For example, the radio receiving section 111 performs quadrature demodulation to down-convert a radio signal to a low frequency band signal. In addition, the radio receiving section 111 uses an A/D (Analog to Digital) converter for converting the continuous signal (analog signal) to a discrete signal (digital signal). The radio receiving section 111 then outputs the digital baseband signal to the CP removal section 112.

The CP removal section 112 removes a guard interval referred to as a CP (Cyclic Prefix) from the digital baseband signal acquired from the radio receiving section 111 to extract effective symbols. A Fourier transform process and an inverse Fourier transform process are performed in effective symbols. A CP is inserted between effective symbols at transmission time. The CP removal section 112 outputs the effective symbols it extracts to the FFT section 113 in order.

The FFT section 113 performs a fast Fourier transform on each signal acquired from the CP removal section 112 as an effective symbol to extract each frequency component. That is to say, the FFT section 113 converts each time domain signal acquired from the CP removal section 112 to a frequency domain signal. The FFT section 113 then outputs the frequency domain signal obtained to the demapping section 114. A transform algorithm other than a fast Fourier transform may be used for converting each time domain signal to a frequency domain signal.

The demapping section 114 rearranges frequency domain signals acquired from the FFT section 113, that is to say, performs a process reverse to a mapping process performed at the transmission end. By doing so, the demapping section 114 reproduces a modulated signal. The demapping section 114 then outputs the modulated signal obtained to the control information extraction section 115.

The control information extraction section 115 separates and extracts determined control information from the modulated signal acquired from the demapping section 114. Control information extracted by the control information extraction section 115 includes information indicative of a receiving timing difference measured by the mobile station 200, information indicative of a precoding matrix selected by the mobile station 200, and the like. The control information extraction section 115 then outputs the control information it extracts to the scheduler 116.

On the basis of the control information acquired from the control information extraction section 115, the scheduler 116 controls the encoding of user data by the encoding section 117, a precoding process by the precoding section 122, and a phase rotation process by the phase rotation section 123. In addition, the scheduler 116 can adaptively change a MCS (Modulation and Coding Scheme) according to a communication state.

For example, when the scheduler 116 acquires control information indicative of a receiving timing difference measured by the mobile station 200, the scheduler 116 determines a phase rotation amount for compensating for the receiving timing difference. When a signal to be transmitted from the radio base station 100 is phase-rotated, the scheduler 116 designates a phase rotation amount for the phase rotation section 123. In addition, when a signal to be transmitted from the radio base station 100a is phase-rotated, the scheduler 116 informs the radio base station 100a via the communication interface 119 of a phase rotation amount. When the radio base station 100a functions as a serving base station, the scheduler 116 acquires information indicative of a phase rotation amount from the radio base station 100a.

Furthermore, when the scheduler 116 acquires control information indicative of a precoding matrix selected by the mobile station 200, the scheduler 116 gives the precoding section 122 instructions to apply the precoding matrix indicated by the control information to a modulated signal. In addition, the scheduler 116 informs the radio base station 100a via the communication interface 119 of the precoding matrix. When the radio base station 100a functions as a serving base station, the scheduler 116 acquires information indicative of the precoding matrix from the radio base station 100a.

On the basis of the result of scheduling by the scheduler 116, the encoding section 117 performs error correction coding on the user data. Turbo coding, convolutional coding, or the like can be used as a coding scheme. The encoding section 117 may adaptively change a coding scheme in accordance with instructions from the scheduler 116. The encoding section 117 then outputs encoded data to the modulation section 118 and transmits the encoded data to the radio base station 100a via the communication interface 119.

The modulation section 118 digital-modulates the encoded data acquired from the encoding section 117. QPSK (Quadrature Phase Shift Keying), 16QAM (Quadrature Amplitude Modulation), 64QAM, or the like can be used as a modulation scheme. The modulation section 118 may adaptively change a modulation scheme in accordance with instructions from the scheduler 116. The modulation section 118 then outputs a modulated signal obtained to the precoding section 122. When the radio base station 100a functions as a serving base station, the modulation section 118 acquires encoded data from the radio base station 100a.

The communication interface 119 performs wired communication with the radio base station 100a via the network 10. For example, when the radio base station 100 functions as a serving base station to the mobile station 200, the communication interface 119 transmits the radio base station 100a information indicative of a phase rotation amount and the information indicative of the precoding matrix acquired from the scheduler 116 and the encoded data acquired from the encoding section 117. On the other hand, when the radio base station 100a functions as a serving base station to the mobile station 200, the communication interface 119 informs the scheduler 116 of information indicative of a phase rotation amount and information indicative of the precoding matrix received from the radio base station 100a, and outputs encoded data received from the radio base station 100a to the modulation section 118.

Each of the RS generation sections 120 and 121 generates a reference signal (RS) which is a known signal. To be concrete, the RS generation section 120 generates a RS specific to each mobile station and outputs it to the precoding section 122. A RS specific to each mobile station may be assigned statically or dynamically. On the other hand, the RS generation section 121 generates RSes specific to transmission apparatus (transmission antennas) and outputs them to the mapping sections 124 and 125.

The precoding section 122 performs a precoding process on the modulated signal acquired from the modulation section 118 and the RS specific to each mobile station acquired from the RS generation section 120. That is to say, the precoding section 122 applies the precoding matrix designated by the scheduler 116 to the modulated signal and the RS specific to each mobile station, and generates transmitted signals according to transmission antenna. The precoding section 122 then outputs the signals generated to the phase rotation section 123. The precoding section 122 holds in advance a code book which is a set of candidate precoding matrices.

The phase rotation section 123 performs a phase rotation process on the signals after the precoding acquired from the precoding section 122. A phase rotation amount for each mobile station is designated by the scheduler 116. The phase rotation section 123 then outputs the signals after the phase rotation according to transmission antenna to the mapping sections 124 and 125. The details of the precoding process and the phase rotation process will be described later.

The mapping sections 124 and 125 map the signals after the phase rotation acquired from the phase rotation section 123 and the RSes specific to the transmission apparatus acquired from the RS generation section 121 to each frequency of a radio resource used for transmission, and consider these signals as frequency domain signals. The mapping section 124 then outputs the signals after the mapping to the IFFT section 126 in order. Similarly, the mapping section 125 outputs the signals after the mapping to the IFFT section 127 in order.

The IFFT sections 126 and 127 perform an inverse fast Fourier transform on the signals acquired from the mapping sections 124 and 125 respectively. That is to say, the IFFT sections 126 and 127 convert the frequency domain signals acquired from the mapping sections 124 and 125, respectively, to time domain signals. The time domain signals obtained at this time are determined-length effective symbols. The IFFT section 126 then outputs the effective symbols obtained to the CP insertion section 128. Similarly, the IFFT section 127 outputs the effective symbols obtained to the CP insertion section 129. A transform algorithm other than an inverse fast Fourier transform may be used for converting a frequency domain signal to a time domain signal.

The CP insertion sections 128 inserts a CP between effective symbols acquired from the IFFT section 126. The CP insertion sections 129 inserts a CP between effective symbols acquired from the IFFT section 127. For example, a replica of a part of a signal included in an effective symbol is used as a CP. The CP insertion sections 128 then outputs signals (symbols) obtained by adding CPs to the effective symbols to the radio transmission section 130. Similarly, the CP insertion section 129 outputs symbols to the radio transmission section 131.

The radio transmission sections 130 and 131 convert the symbols acquired from the CP insertion sections 128 and 129, respectively, to radio signals. For example, each of the radio transmission sections 130 and 131 uses a D/A (Digital to Analog) converter for converting a digital signal to an analog signal. Furthermore, each of the radio transmission sections 130 and 131 performs quadrature modulation to convert the analog signal to a high frequency band signal. Each of the radio transmission sections 130 and 131 then radio-outputs the high frequency band signal from a transmission antenna included in the radio base station 100. Each antenna may be used both for receiving and for transmitting.

In the above description the radio base station 100 phase-rotates the modulated signal on the frequency domain before the inverse fast Fourier transform process. This brings about the same effect that is obtained by circular-shifting a signal after an inverse Fourier transform process on the time domain. The radio base station 100 transmits the data after the encoding and before the modulation to the radio base station 100a. However, the radio base station 100 may transmit the data before the encoding or may transmit the signal after the modulation. That is to say, in addition to the above method, there may be various modifications of how to assign the processes to the radio base stations 100 and 100a.

The CP removal section 112, FFT section 113, demapping section 114, control information extraction section 115, scheduler 116, encoding section 117, modulation section 118, RS generation sections 120 and 121, precoding section 122, phase rotation section 123, mapping sections 124 and 125, IFFT sections 126 and 127, and CP insertion sections 128 and 129 are realized by processor(s), e.g., CPU, Digital Signal Processor (DSP).

Figure 4:
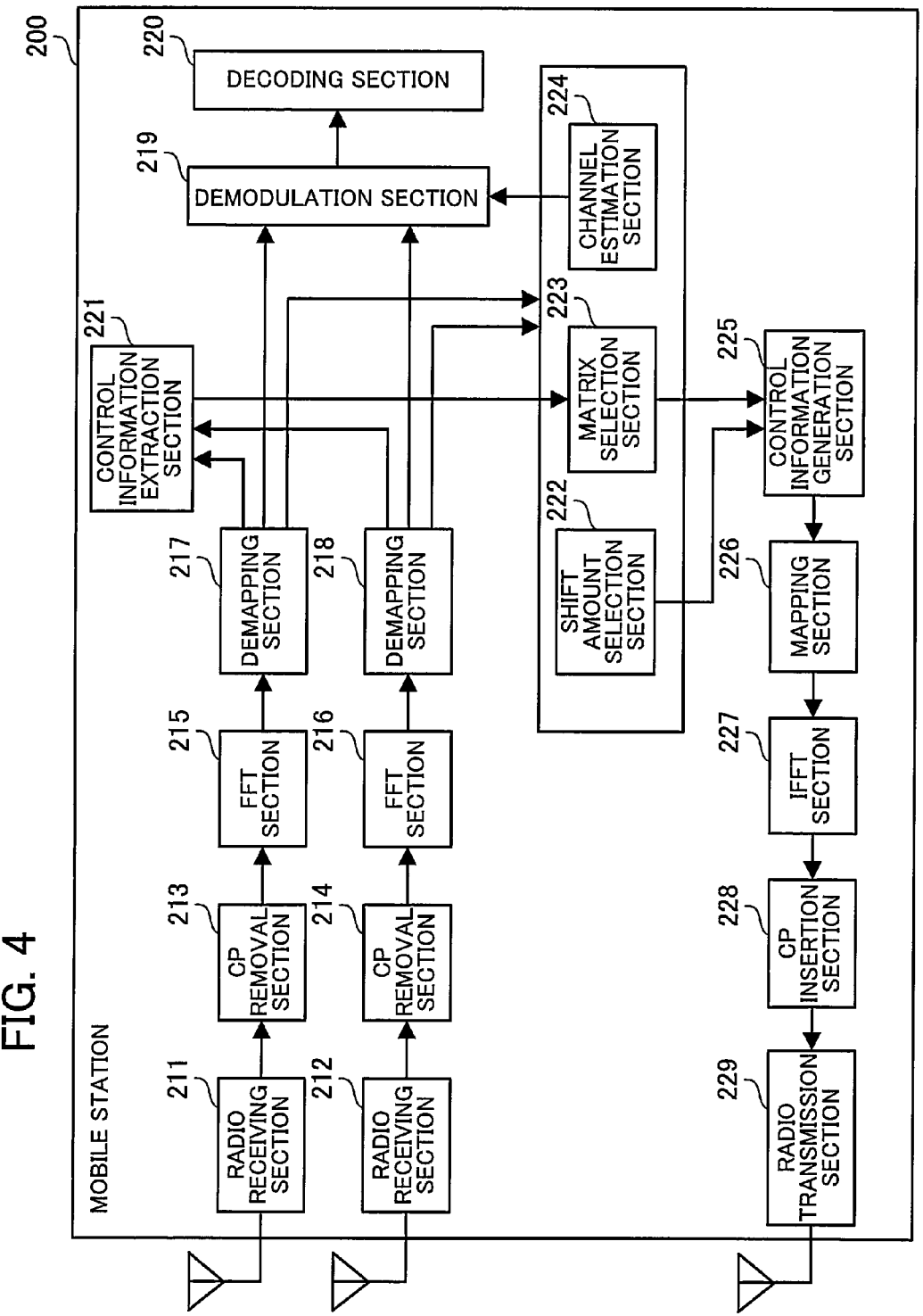
FIG. 4 is a block diagram of a mobile station according to the first embodiment.

FIG. 4 is a block diagram of a mobile station according to the first embodiment. The mobile station 200 includes radio receiving sections 211 and 212, CP removal sections 213 and 214, FFT sections 215 and 216, demapping sections 217 and 218, a demodulation section 219, a decoding section 220, a control information extraction section 221, a shift amount selection section 222, a matrix selection section 223, a channel estimation section 224, a control information generation section 225, a mapping section 226, an IFFT section 227, a CP insertion section 228, and a radio transmission section 229.

Each of the radio receiving sections 211 and 212 converts a radio signal received by a receiving antenna included in the mobile station 200 to a digital baseband signal. For example, each of the radio receiving sections 211 and 212 performs quadrature demodulation to down-convert a radio signal to a low frequency band signal. In addition, each of the radio receiving sections 211 and 212 uses an A/D converter for converting the analog signal to a digital signal. The radio receiving section 211 then outputs the digital baseband signal to the CP removal section 213. Similarly, the radio receiving section 212 outputs the digital baseband signal to the CP removal section 214.

The CP removal sections 213 and 214 remove CPs from the digital baseband signals acquired from the radio receiving sections 211 and 212, respectively, to extract effective symbols. The CP removal section 213 then outputs the effective symbols it extracts to the FFT section 215 in order. Similarly, the CP removal section 214 outputs the effective symbols it extracts to the FFT section 216 in order.

The FFT sections 215 and 216 perform a fast Fourier transform on signals acquired from the CP removal sections 213 and 214, respectively, as effective symbols to extract each frequency component. That is to say, the FFT sections 215 and 216 convert time domain signals acquired from the CP removal sections 213 and 214, respectively, to frequency domain signals. The FFT section 215 then outputs the frequency domain signals to the demapping section 217. Similarly, the FFT section 216 outputs the frequency domain signals to the demapping section 218.

The demapping sections 217 and 218 rearrange the frequency domain signals acquired from the FFT sections 215 and 216 respectively, that is to say, perform a process reverse to a mapping process performed at the transmission end. By doing so, the demapping sections 217 and 218 reproduce modulated signals. The demapping sections 217 and 218 then outputs the modulated signals obtained to the demodulation section 219 and the control information extraction section 221. In addition, each of the demapping sections 217 and 218 outputs a RS specific to a transmission apparatus to the shift amount selection section 222 and the matrix selection section 223 and outputs a RS specific to the mobile station 200 to the channel estimation section 224.

The demodulation section 219 separates the modulated signals acquired from the demapping sections 217 and 218 according to transmission antenna and demodulates signals obtained. That is to say, the demodulation section 219 performs channel compensation on the modulated signals by the use of a channel estimation value acquired from the channel estimation section 224. The demodulation section 219 then separates signals outputted from different transmission antennas from the modulated signals after the channel compensation, combines the signals, and performs demodulation. After that, the demodulation section 219 outputs encoded data (user data) obtained to the decoding section 220.

The decoding section 220 decodes the encoded data acquired from the demodulation section 219. The decoding section 220 then outputs the user data obtained to a module (not illustrated) which performs data processing according to the type of the data. As a result, the mobile station 200 uses received data.

The control information extraction section 221 separates and extracts determined control information from the modulated signals acquired from the demapping sections 217 and 218. The extracted control information includes information indicative of a circular shift amount determined by the radio base station 100 (applied to signals transmitted from the radio base stations 100 and 100a). The control information extraction section 221 then informs the matrix selection section 223 of the circular shift amount.

The shift amount selection section 222 measures a delay profile of a signal from each transmission antenna by the use of the RSes specific to the transmission apparatus acquired from the demapping sections 217 and 218. The RSes specific to the transmission apparatus are known signals not circular-shifted, so an original delay amount can be found. On the basis of the delay profile, the shift amount selection section 222 estimates a circular shift amount (receiving timing difference) for making timing at which a signal from each transmission antenna is received the same. The shift amount selection section 222 then informs the control information generation section 225 of the receiving timing difference.

For example, a transmission antenna for which the average of receiving power in a long interval is the highest may be selected as a transmission antenna used as reference for estimating a receiving timing difference. However, a transmission antenna included in a serving base station may be set in advance as reference.

The matrix selection section 223 selects a proper precoding matrix by the use of the RSes specific to the transmission apparatus acquired from the demapping sections 217 and 218 and the information indicative of the current circular shift amount acquired from the control information extraction section 221. To be concrete, the matrix selection section 223 performs channel estimation of each path between a transmission antenna and a receiving antenna from a RS specific to a transmission apparatus. The matrix selection section 223 then evaluates each candidate precoding matrix by the use of a channel estimation value and the current circular shift amount and selects a proper precoding matrix. The details of precoding matrix selection will be described later. The matrix selection section 223 then informs the control information generation section 225 of the selected precoding matrix.

The channel estimation section 224 performs channel estimation by the use of the RSes specific to the mobile stations acquired from the demapping sections 217 and 218. A RS specific to a mobile station is a known signal on which precoding and a phase rotation have been performed, so a channel estimation value after the precoding can be found. The channel estimation section 224 then outputs channel estimation values to the demodulation section 219.

The control information generation section 225 generates control information to be transmitted to the radio base station 100 which is a serving base station. For example, when the shift amount selection section 222 informs the control information generation section 225 of the receiving timing difference (desired circular shift amount), the control information generation section 225 generates control information (bit string with determined bit length, for example) indicative of the receiving timing difference. In addition, when the matrix selection section 223 informs the control information generation section 225 of the selected precoding matrix, the control information generation section 225 generates control information (identification number given in advance to each precoding matrix, for example) indicative of the precoding matrix. The control information generation section 225 then outputs a signal including the generated control information to the mapping section 226.

The mapping section 226 maps the signal including the control information acquired from the control information generation section 225 to each frequency of a radio resource used for transmission, and considers this signal as a frequency domain signal. The mapping section 226 then outputs the signals after the mapping to the IFFT section 227 in order.

The IFFT section 227 performs an inverse fast Fourier transform on the signals acquired from the mapping section 226. That is to say, the IFFT section 227 converts the frequency domain signals acquired from the mapping section 226 to time domain signals. The time domain signals obtained at this time are determined-length effective symbols. The IFFT section 227 then outputs the effective symbols obtained to the CP insertion section 228. A transform algorithm other than an inverse fast Fourier transform may be used for converting a frequency domain signal to a time domain signal.

The CP insertion section 228 inserts a CP between effective symbols acquired from the IFFT section 227 to generate a symbol. For example, a replica of a part of a signal included in an effective symbol is used as a CP. The CP insertion section 228 then outputs symbols to the radio transmission section 130.

The radio transmission section 229 converts the symbols acquired from the CP insertion section 228 to radio signals. For example, the radio transmission section 229 uses a D/A converter for converting a digital signal to an analog signal. Furthermore, the radio transmission section 229 performs quadrature modulation to convert the analog signal to a high frequency band signal. The radio transmission section 229 then radio-outputs the high frequency band signal from a transmission antenna included in the mobile station 200. Each antenna may be used both for receiving and for transmitting.

CP removal sections 213 and 214, FFT sections 215 and 216, demapping sections 217 and 218, demodulation section 219, decoding section 220, control information extraction section 221, shift amount selection section 222, matrix selection section 223, channel estimation section 224, control information generation section 225, mapping section 226, IFFT section 227, and CP insertion section 228 may be realized by processor(s), e.g., CPU and DSP.

In the above description the radio base station 100 informs the mobile station 200 of the current circular shift amount. On the other hand, if the desired circular shift amount (receiving timing difference) of which the mobile station 200 informs the radio base station 100 is applied without being changed, it is not necessary that the radio base station 100 should inform the mobile station 200 of the current circular shift amount. That is to say, the matrix selection section 223 can select a proper precoding matrix by the use of the receiving timing difference measured by the shift amount selection section 222.

Figure 5:
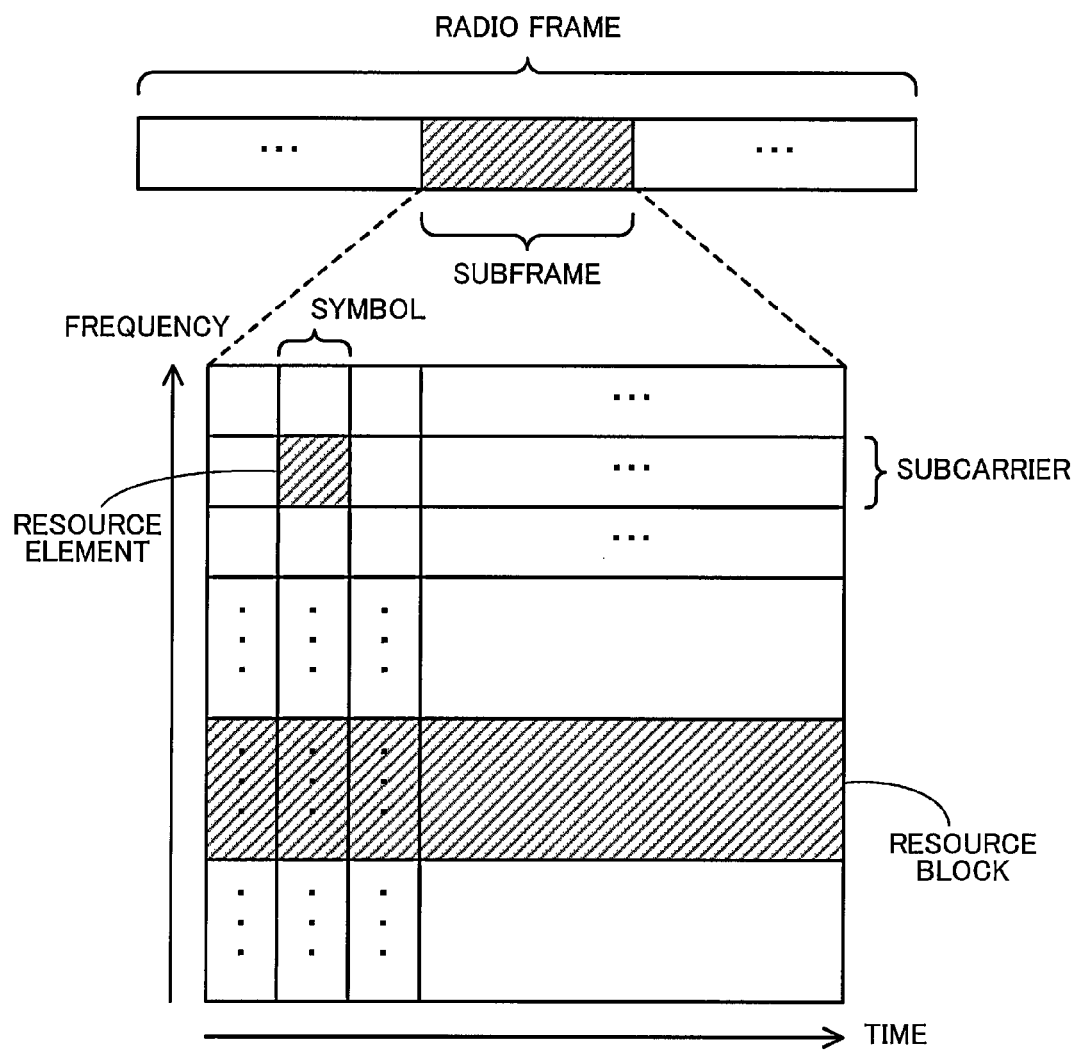
FIG. 5 is an example of the structure of a radio frame.

FIG. 5 is an example of the structure of a radio frame. A radio frame having such structure is exchanged between the radio base station 100 or 100a and the mobile station 200. One radio frame includes a plurality of subframes. In each subframe a radio resource expressed as (frequency domain)× (time domain) is subdivided and managed. A minimum unit in the frequency direction is referred to as a subcarrier. A minimum unit in the time direction is a symbol. The minimum unit of a radio resource specified by (1 subcarrier)×(1 symbol) is referred to as a resource element. For example, a radio resource corresponding to a plurality of subcarriers included in one subframe is assigned to the mobile station 200 as a resource block. In addition, an applied precoding matrix is selected, for example, by the subband including a plurality of resource blocks.

Figure 6:
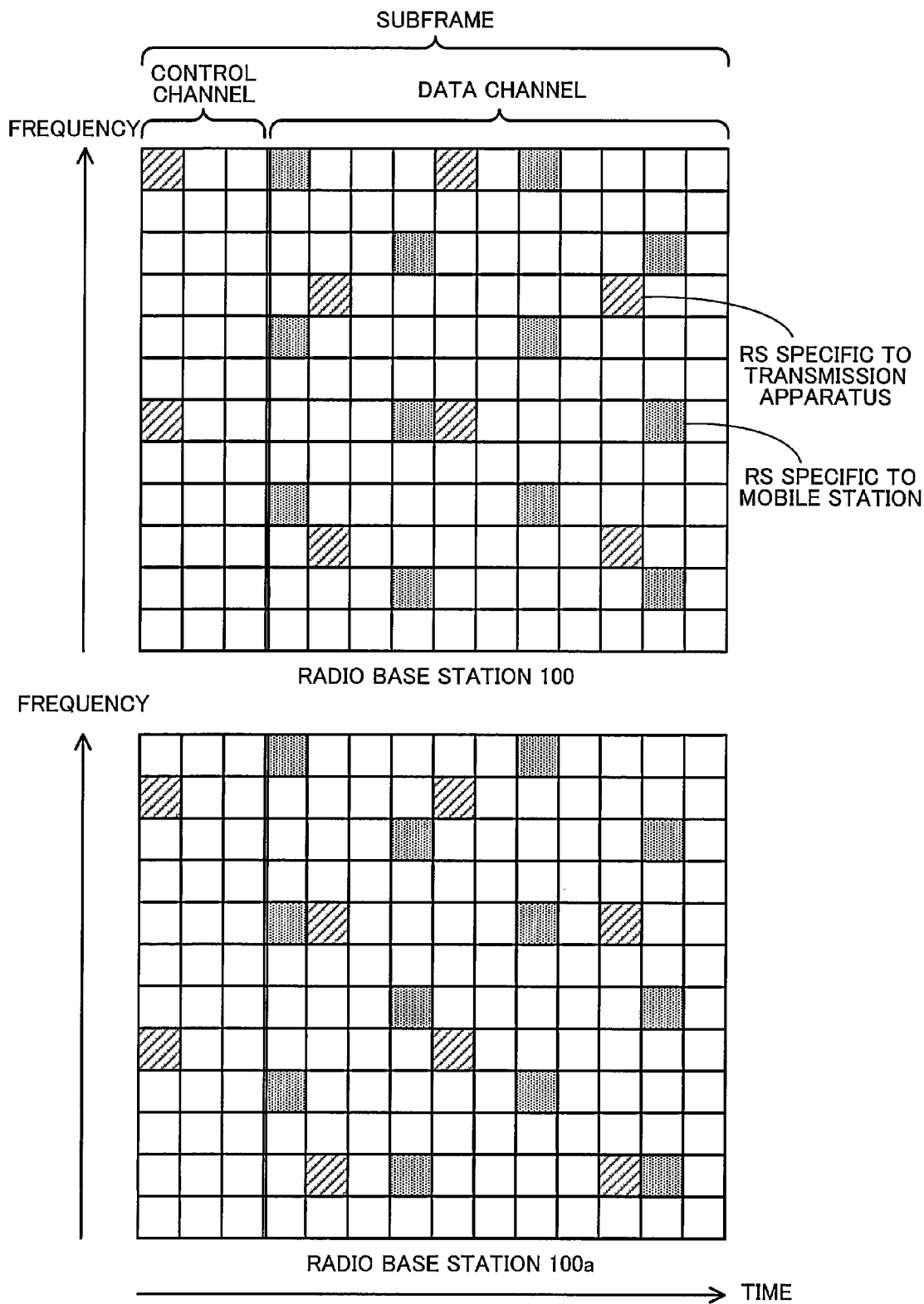
FIG. 6 is an example of the use of a downlink radio resource.

FIG. 6 is an example of the use of a downlink radio resource. A radio resource on the upper side indicates an example of the arrangement of signals outputted from one transmission antenna included in the radio base station 100. A radio resource on the lower side indicates an example of the arrangement of signals outputted from one transmission antenna included in the radio base station 100a. In the example of FIG. 6, the three leading symbols of each subframe are assigned to a control channel used for transmitting control information and the remaining symbols are assigned to a data channel used for transmitting user data.

A RS specific to a transmission apparatus is distributed and arranged in the whole of the control channel and the data channel. It is desirable that a RS specific to a transmission apparatus should be arranged in different resource elements according to transmission antenna. By doing so, the mobile station 200 can easily separate and recognize signals from different transmission antennas. On the other hand, a RS specific to a mobile station is distributed and arranged in the entire data channel. A RS specific to a mobile station can be arranged in the same resource element for all transmission antennas.

FIG. 7 is an example of a precoding matrix. The radio base stations 100 and 100a and the mobile station 200 hold a common code book like that indicated in FIG. 7. In this example, the number of transmission streams is four, the number of transmission antennas is four, and the number of precoding matrices is eight. An identification number can be given to each precoding matrix. In this case, the radio base station 100 or 100a or the mobile station 200 can uniquely specify a precoding matrix by designating an identification number.

The details of the precoding process and the phase rotation process performed by the radio base station 100 or 100a and the precoding matrix selection process performed by the mobile station 200 will now be described. These processes will be defined with the number of transmission antennas generalized. That is to say, the following definitions are not limited to the case where two radio base stations each including two transmission antennas cooperate.

It is assumed that J radio base stations each including $N_i$ (i=0, 1, ..., J−1) transmission antennas cooperate. A transmitted signal vector y(n) outputted from a plurality of transmission antennas can be defined as (Equation 1)

$$y(n) = \Xi(n) \cdot W(n) \cdot x(n) \quad (1)$$

where $\Xi(n)$ is a matrix for a phase rotation process, W(n) is a precoding matrix applied to an nth subcarrier, and x(n) is a modulated signal vector in the nth subcarrier.

$\Xi(n)$ in equation (1) can be defined as (Equation 2)

$$\Xi(n) = \begin{pmatrix} e^{2\pi n \Delta_0/N} I^{(0)} & & & O \\ & e^{2\pi n \Delta_1/N} I^{(1)} & & \\ & & \ddots & \\ O & & & e^{2\pi n \Delta_{J-1}/N} I^{(J-1)} \end{pmatrix} \quad (2)$$

where N is effective symbol length (number of samples handled by one FFT), $\Delta_i$ is a sample number indicative of a receiving timing difference (desired circular shift amount) measured by the mobile station 200, and $I^{(i)}$ is an $N_i \times N_i$ unit matrix.

If two radio base stations each including two transmission antennas cooperate, then J=2 and $N_0=N_1=2$. Accordingly, $\Xi(n)$ can be defined as (Equation 3)

$$\Xi(n) = \begin{pmatrix} 1 & 0 & 0 & 0 \\ 0 & 1 & 0 & 0 \\ 0 & 0 & e^{2\pi n \Delta/N} & 0 \\ 0 & 0 & 0 & e^{2\pi n \Delta/N} \end{pmatrix} \quad (3)$$

On the other hand, a signal r(n) received by the mobile station 200 can be defined as (Equation 4)

$$r(n) = H(n) \cdot y(n) + N(n) \quad (4)$$

where H(n) is a channel matrix in the nth subcarrier and N(n) is a noise matrix in the nth subcarrier.

The matrix selection section 223 evaluates the matrix product of a channel estimation value matrix $\tilde{H}(n)$, the phase rotation matrix $\Xi(n)$, and each candidate precoding matrix W(n) by a determined evaluation function. The matrix selection section 223 then selects a precoding matrix for which an evaluation value is the highest. For example, the function f defined by equation (5) is used as an evaluation function.

(Equation 5)

$$f(\tilde{H}(n) \cdot \Xi(n) \cdot W(n)) = \sum_n \sum_{l=0}^{L-1} \frac{|\tilde{H}(n) \cdot \Xi(n) \cdot W(n)|^2_{l,l}}{\sum_{k=0, k \neq l}^{L-1} |\tilde{H}(n) \cdot \Xi(n) \cdot W(n)|^2_{l,l} + N} \quad (5)$$

Figure 8:
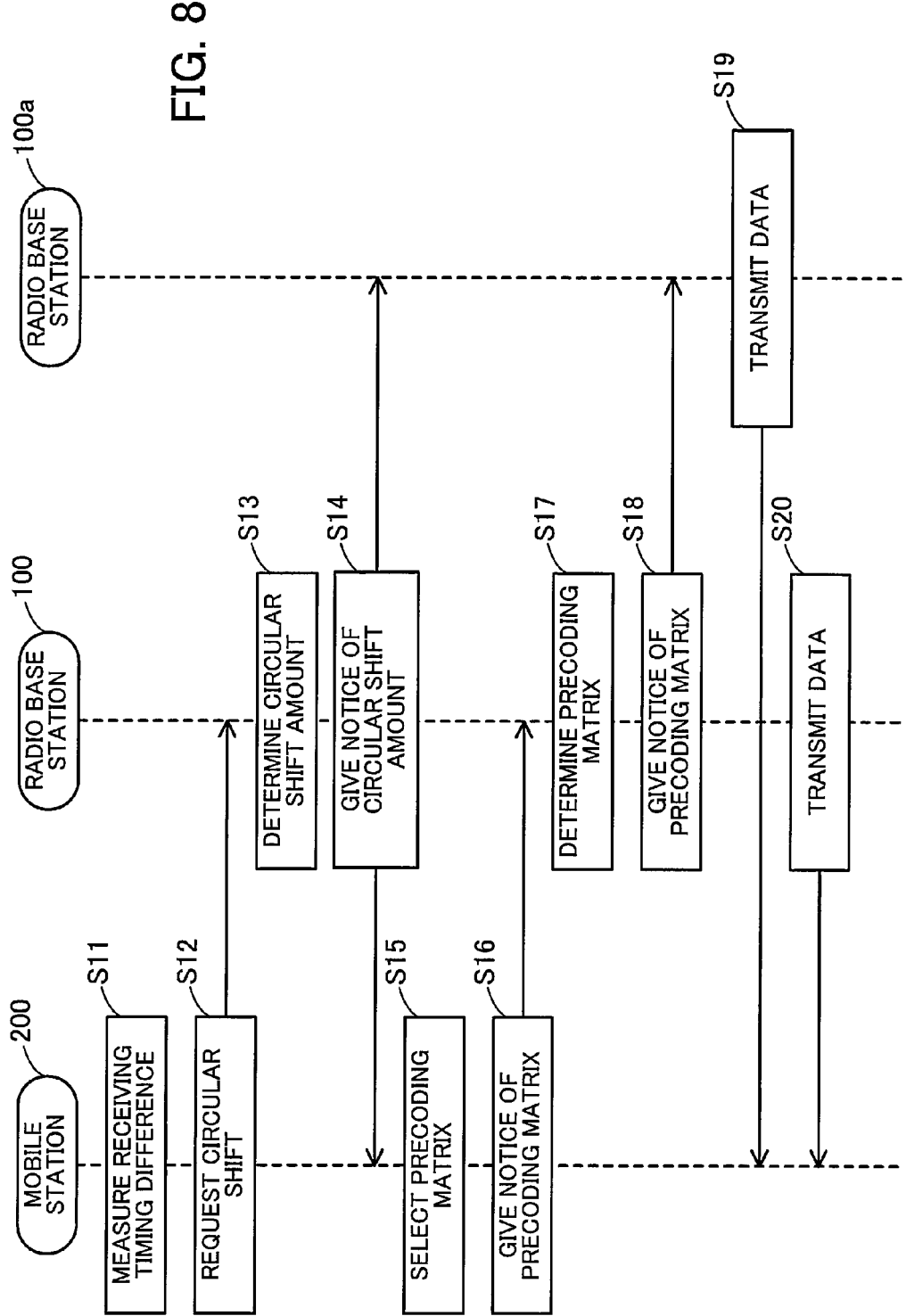
FIG. 8 is a flow chart of downlink communication control.

FIG. 8 is a flow chart of downlink communication control. The process illustrated in FIG. 8 will now be described in order of step number.

(Step S11) The mobile station 200 uses a RS specific to a transmission apparatus outputted from each transmission antenna included in the radio base stations 100 and 100a to measure a receiving timing difference for a signal from each transmission antenna.

(Step S12) The mobile station 200 transmits control information indicative of the receiving timing difference (desired circular shift amount) measured in step S11 to the radio base station 100 which is a serving base station. The control information indicative of the receiving timing difference includes identification information for a reference transmission antenna, a sample number indicative of a receiving timing difference for each transmission antenna other than the reference transmission antenna with respect to the reference transmission antenna, and the like.

(Step S13) The radio base station 100 receives the control information which the mobile station 200 transmits in step S12, and determines a circular shift amount applied to a signal transmitted from each transmission antenna included in the radio base stations 100 and 100a. Usually a circular shift amount (circular shift amount requested by the mobile station 200) which is sufficient to compensate for the receiving timing difference of which the mobile station 200 informs the radio base station 100 is applied.

(Step S14) The radio base station 100 transmits control information indicative of the circular shift amount which the radio base station 100 determines in step S13 to the mobile station 200. In addition, the radio base station 100 gives notice of the determined circular shift amount to the radio base station 100a which performs cooperative transmission via the network 10.

(Step S15) The mobile station 200 receives the control information which the radio base station 100 transmits in step S14, and uses the phase rotation amount applied to a signal transmitted from each transmission antenna and the RS specific to the transmission apparatus outputted from each transmission antenna to select a proper precoding matrix from a code book defined in advance.

(Step S16) The mobile station 200 transmits control information indicative of the precoding matrix which the mobile station 200 selects in step S15 (control information including an identification number of the precoding matrix which the mobile station 200 selects in step S15, for example) to the radio base station 100 which is a serving base station.

(Step S17) The radio base station 100 receives the control information which the mobile station 200 transmits in step S16, and determines a precoding matrix applied to a transmitted signal. Usually the radio base station 100 applies the precoding matrix selected by the mobile station 200.

(Step S18) The radio base station 100 gives notice of the precoding matrix which the radio base station 100 determines in step S17 to the radio base station 100a which performs cooperative transmission via the network 10.

(Step S19) The radio base station 100a generates a signal including user data by the use of the circular shift amount of which the radio base station 100 informs the radio base station 100a in step S14 and the precoding matrix of which the radio base station 100 informs the radio base station 100a in step S18, and transmits the signal to the mobile station 200.

(Step S20) The radio base station 100 generates a signal including user data by the use of the circular shift amount which the radio base station 100 determines in step S13 and the precoding matrix which the radio base station 100 determines in step S17, and transmits the signal to the mobile station 200.

After cooperative transmission is begun, the circular shift amount and the precoding matrix can be updated regularly or irregularly. Update can be realized by the same process as described above. The circular shift amount and the precoding matrix may be updated at the same timing or at different timings.

Figure 9:
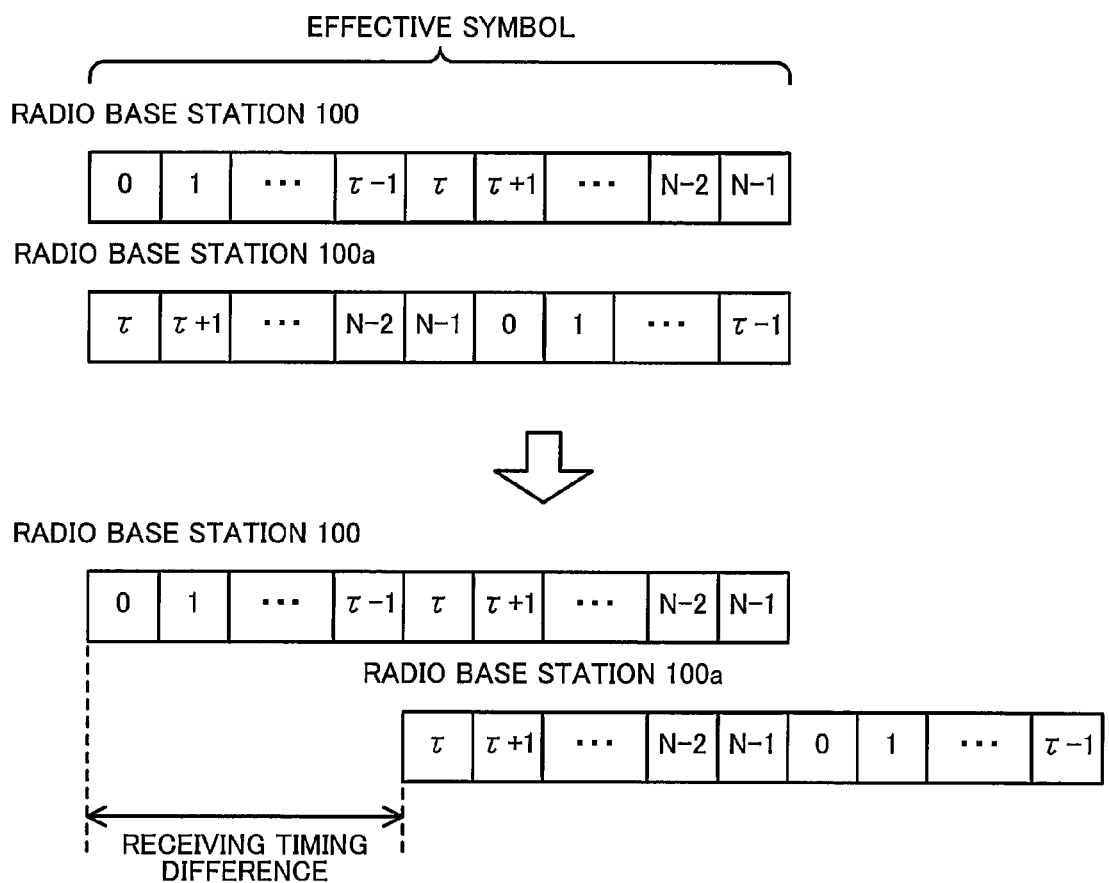
FIG. 9 illustrates symbol transmission and receiving timing.

FIG. 9 illustrates symbol transmission and receiving timing. A modulated signal is phase-rotated on the frequency domain. As a result, as illustrated in FIG. 9, N samples included in an effective symbol after a fast Fourier transform are circular-shifted in the effective symbol.

For example, it is assumed that a signal from a transmission antenna of the radio base station 100a reaches the mobile station 200 with a delay of τ samples after a signal from a transmission antenna of the radio base station 100 in a state in which a phase rotation is not performed. In this case, for example, a signal which is circular-shifted so as to advance transmission timing by τ samples is transmitted from the transmission antenna of the radio base station 100a.

The two effective symbols transmitted in this way reach the mobile station 200 at the same timing. That is to say, the timing of a sample #τ in one effective symbol matches the timing of a sample #τ in the other effective symbol. Accordingly, a state in which a preceding wave and a delayed wave the contents of which are the same are multiplexed and received can be avoided.

In the example of FIG. 9, the mobile station 200 may use samples #0 through #(τ−1) of the effective symbol received from the radio base station 100a for demodulation, or discard them without using them. Furthermore, instead of advancing the transmission timing of the radio base station 100a, the radio base station 100 may delay its transmission timing. Moreover, the radio base station 100 may delay its transmission timing by τ/2 samples and advance the transmission timing of the radio base station 100a by τ/2 samples.

Figure 10:
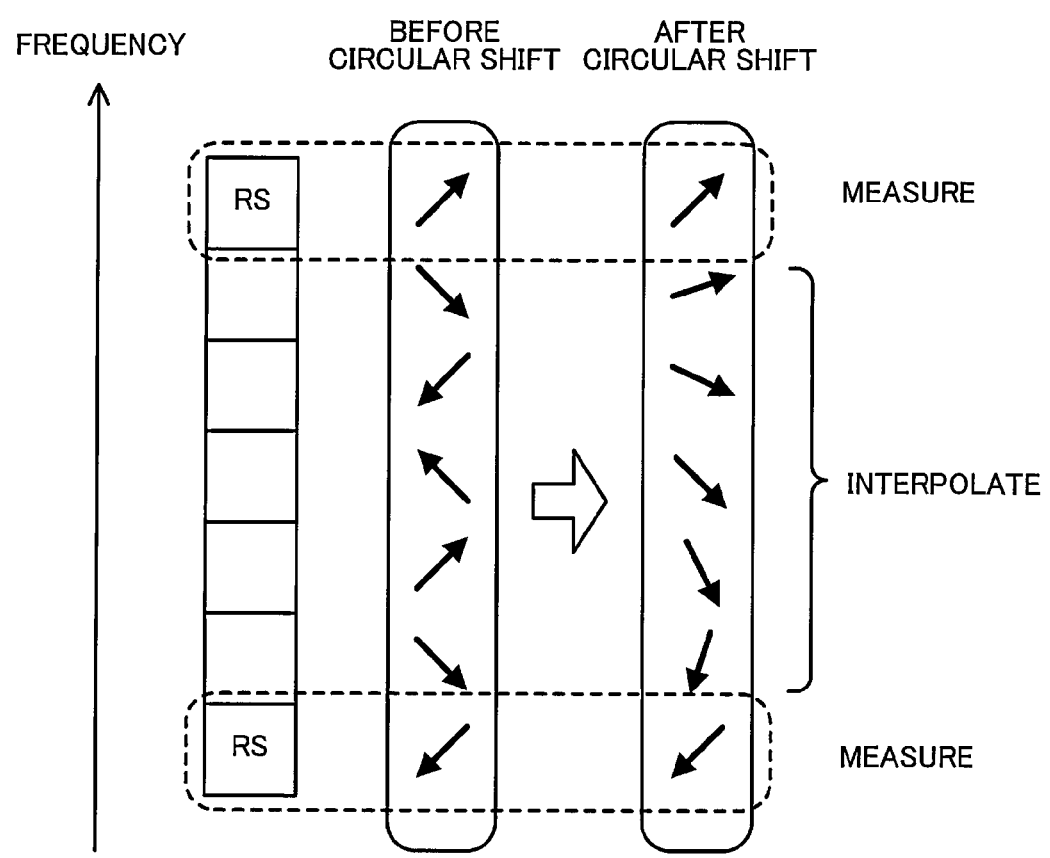
FIG. 10 illustrates channel fluctuations in received signals.

FIG. 10 illustrates channel fluctuations in received signals. With channel estimation the following method may be used. A known signal (RS) inserted intermittently into the frequency domain is used for estimating a channel estimation value for the frequency. A channel estimation value for another frequency is predicted from the channel estimation value directly measured (linear interpolation, for example).

However, if a preceding wave and a delayed wave the contents of which are the same are multiplexed, there are very great channel fluctuations on the frequency domain. Accordingly, it is extremely difficult to predict a channel estimation value. That is to say, a channel estimation value is different from an actual channel state and the effect of channel compensation cannot be obtained adequately. On the other hand, if a receiving timing difference is compensated for by a phase rotation (circular shift) and the same receiving timing is realized, channel fluctuations on the frequency domain are controlled. As a result, it is easy to predict a channel estimation value. Accordingly, the effect of channel compensation can be expected in a receiving process.

By adopting the mobile telecommunication system according to the first embodiment, the difference between the timings at which the mobile station 200 receives signals from a plurality of transmission antennas is controlled. That is to say, the radio base station 100 adjusts the timing of transmission by each transmission antenna so as to make the timings of receiving by the mobile station 200 as close to one another as possible. This prevents very great channel fluctuations at the mobile station 200 and communication quality is improved.

In the first embodiment a phase rotation is performed on the frequency domain in order to realize a circular shift in a symbol. As a result, even if signals from a plurality of mobile stations are multiplexed in the frequency direction, there is no need to perform an inverse fast Fourier transform process according to mobile station. Accordingly, the first embodiment carries the advantage that a transmission process and a transmission circuit can be simplified.

Second Embodiment

A second embodiment will now be described. The differences between the above first embodiment and the second embodiment will chiefly be described and descriptions of the same items will be omitted. In a mobile telecommunication system according to the second embodiment a circular shift is performed on the time domain instead of performing a phase rotation on the frequency domain. By doing so, transmission timing can be changed.

Figure 11:
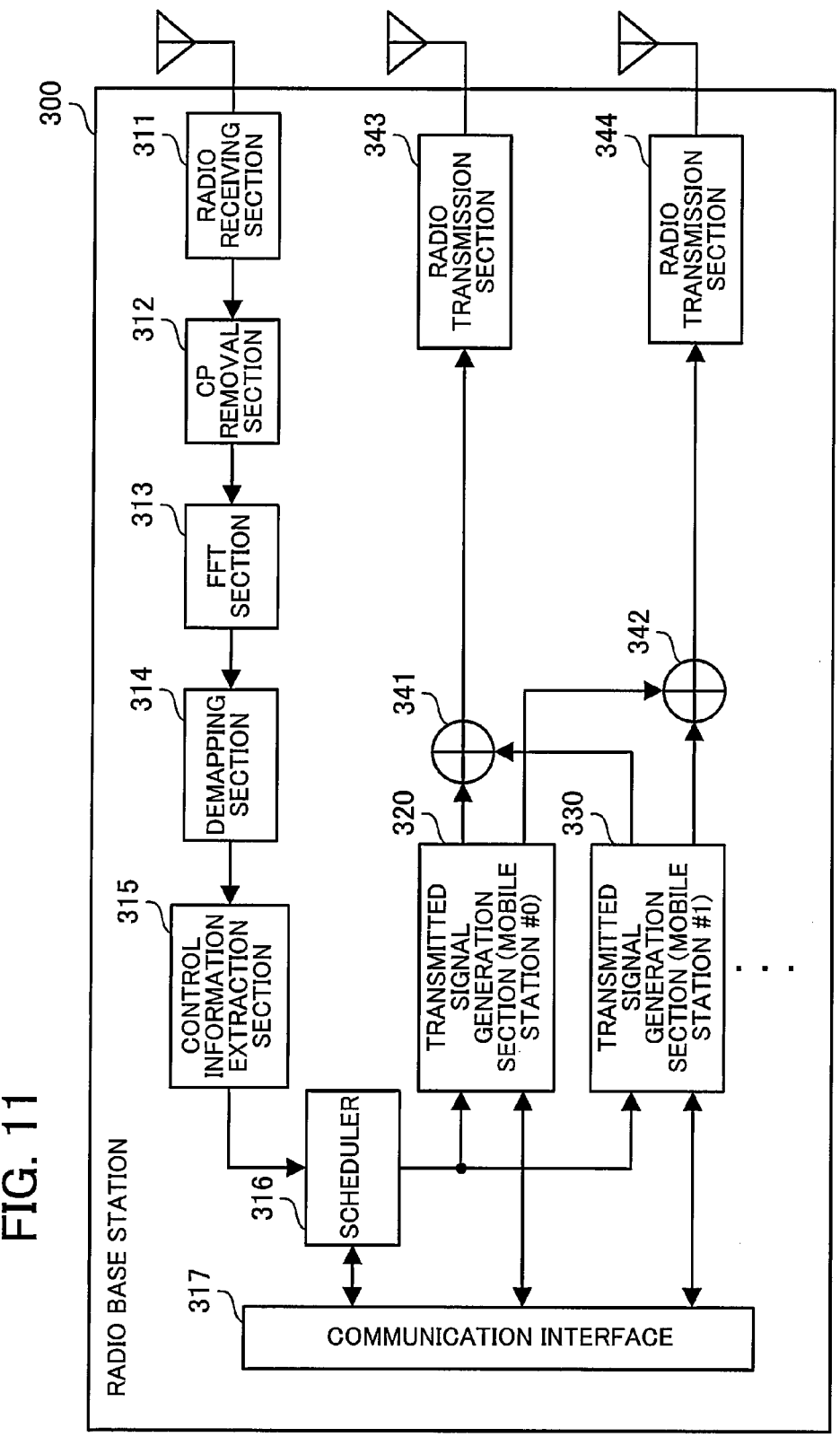
FIG. 11 is a block diagram of a radio base station in a second embodiment.

FIG. 11 is a block diagram of a radio base station in the second embodiment. A radio base station 300 is used in place of the radio base station 100 in the first embodiment. The radio base station 300 includes a radio receiving section 311, a CP removal section 312, a FFT section 313, a demapping section 314, a control information extraction section 315, a scheduler 316, a communication interface 317, transmitted signal generation sections 320 and 330, multiplexing sections 341 and 342, and radio transmission sections 343 and 344.

A process performed by a module other than the transmitted signal generation sections 320 and 330 and the multiplexing sections 341 and 342 is the same as that performed by the module which is included in the radio base station 100 in the first embodiment and which has the same name.

Each of the transmitted signal generation sections 320 and 330 generates a transmitted signal outputted from each transmission antenna under the control of the scheduler 316. In the example of FIG. 11, two transmitted signal generation sections are included. However, the number of transmitted signal generation sections which can be included corresponds to that of mobile stations which the radio base station 300 can simultaneously accommodate. That is to say, the transmitted signal generation sections 320 and 330 generate transmitted signals destinations of which are different mobile stations. The details of the transmitted signal generation sections 320 and 330 will be described later.

The multiplexing sections 341 and 342 multiplex the transmitted signals which are acquired from the transmitted signal generation sections 320 and 330 and the destinations of which are the different mobile stations. That is to say, the multiplexing section 341 multiplexes transmitted signals the destinations of which are the different mobile stations and which are to be outputted from one of two transmission antennas, and outputs them to the radio transmission section 343. The multiplexing section 342 multiplexes transmitted signals the destinations of which are the different mobile stations and which are to be outputted from the other transmission antenna, and outputs them to the radio transmission section 344.

Figure 12:
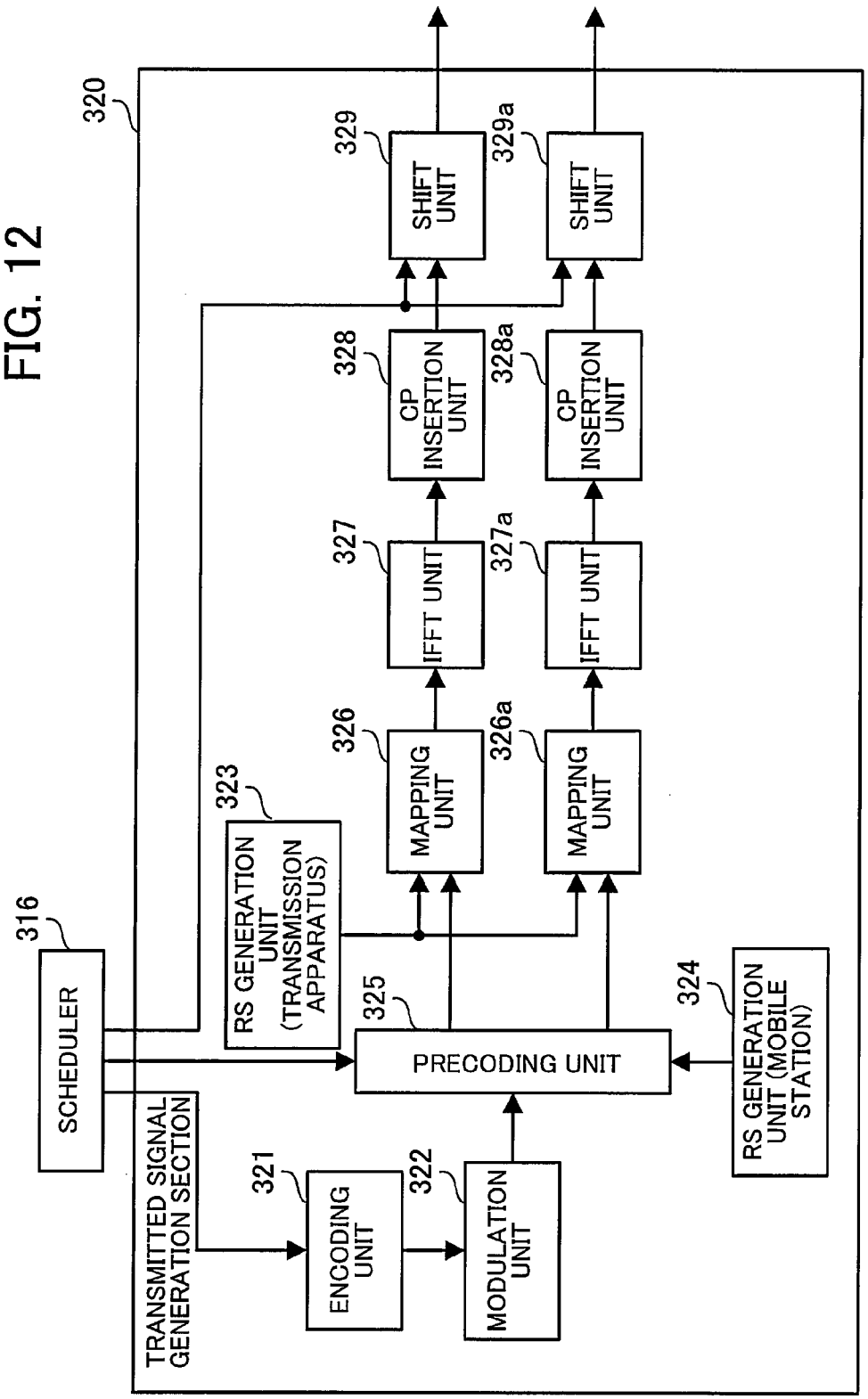
FIG. 12 is a block diagram which illustrates the details of a transmitted signal generation section.

FIG. 12 is a block diagram which illustrates the details of the transmitted signal generation section. The transmitted signal generation section 320 includes an encoding unit 321, a modulation unit 322, RS generation units 323 and 324, a precoding unit 325, mapping units 326 and 326a, IFFT units 327 and 327a, CP insertion units 328 and 328a, and shift units 329 and 329a. The transmitted signal generation section 330 can also be realized by the same structure that is adopted in the transmitted signal generation section 320.

A process performed by a module other than the shift units 329 and 329a is the same as that performed by the module which is included in the radio base station 100 in the first embodiment and which has the same name. However, a modulated signal on which a precoding process has been performed by the precoding unit 325 is outputted to the mapping units 326 and 326a without being phase-rotated on the frequency domain.

The shift units 329 and 329a circular-shift digital baseband signals acquired from the CP insertion units 328 and 328a, respectively, in symbols. A circular shift amount is designated by the scheduler 316. That is to say, the transmitted signal generation section 320 circular-shifts a time domain signal after an inverse Fourier transform instead of phase-rotating a frequency domain signal before an inverse Fourier transform. By doing so, the same effect that is achieved by phase rotation on the frequency domain can be obtained.

By adopting the mobile telecommunication system according to the second embodiment, the difference between the timings at which the mobile station 200 receives signals from a plurality of transmission antennas is controlled. This is the same with the first embodiment. That is to say, the radio base station 300 adjusts the timing of transmission by each transmission antenna so as to make the timings of receiving by the mobile station 200 as close to one another as possible. As a result, communication quality is improved.

Third Embodiment

A third embodiment will now be described. The differences between the above first embodiment and the third embodiment will chiefly be described and descriptions of the same items will be omitted. A mobile telecommunication system according to the third embodiment includes a communication control station as an upper station to a radio base station for controlling cooperative transmission using a plurality of transmission antennas.

Figure 13:
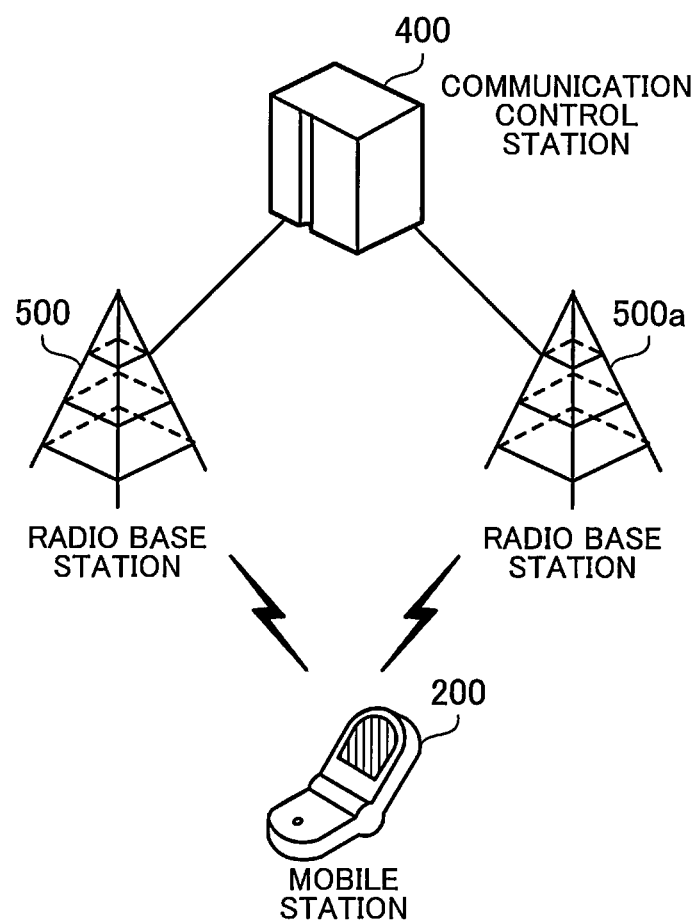
FIG. 13 illustrates the structure of a mobile telecommunication system according to a third embodiment.

FIG. 13 illustrates the structure of the mobile telecommunication system according to the third embodiment. The mobile telecommunication system according to the third embodiment includes a mobile station 200, a communication control station 400, and radio base stations 500 and 500a. The communication control station 400 is connected to the radio base stations 500 and 500a through wire.

The communication control station 400 is a transmission apparatus which exchanges user data and control information with the mobile station 200 via the radio base station 500 or 500a. The communication control station 400 demodulates and decodes a signal received from the radio base station 500 or 500a. In addition, the communication control station 400 generates a signal a destination of which is the mobile station 200 by coding and modulation and transmits it to the radio base station 500 or 500a. Furthermore, the communication control station 400 can control the timing of radio transmission by the radio base station 500 or 500a.

Each of the radio base stations 500 and 500a is a radio communication apparatus which can perform radio communication with the mobile station 200. Each of the radio base stations 500 and 500a performs only radio signal processing. That is to say, each of the radio base stations 500 and 500a transfers a signal received from the mobile station 200 to the communication control station 400. In addition, each of the radio base stations 500 and 500a radio-outputs a signal received from the communication control station 400 to the mobile station 200.

Figure 14:
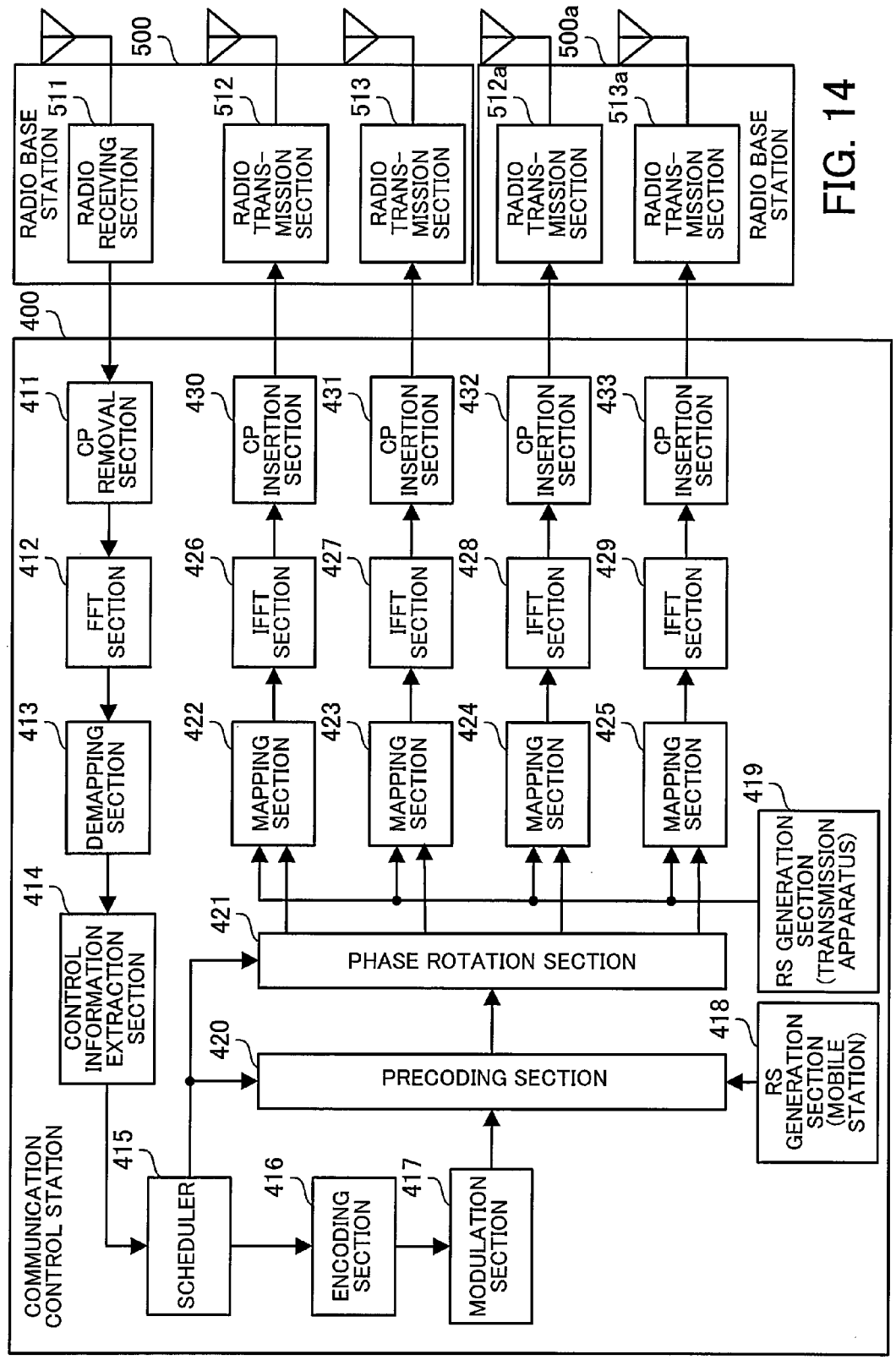
FIG. 14 is a block diagram of a communication control station in the third embodiment.

FIG. 14 is a block diagram of the communication control station in the third embodiment.

The communication control station 400 includes a CP removal section 411, a FFT section 412, a demapping section 413, a control information extraction section 414, a scheduler 415, an encoding section 416, a modulation section 417, RS generation sections 418 and 419, a precoding section 420, a phase rotation section 421, mapping sections 422, 423, 424, and 425, IFFT sections 426, 427, 428, and 429, and CP insertion sections 430, 431, 432, and 433.

The radio base station 500 includes a radio receiving section 511 and radio transmission sections 512 and 513. The radio base station 500a includes radio transmission sections 512a and 513a.

A process performed by each module included in the communication control station 400 and the radio base stations 500 and 500a is the same as that performed by the module which is included in the radio base station 100 in the first embodiment and which has the same name. However, the communication control station 400 performs processing from encoding to symbol generation and the radio base stations 500 and 500a perform radio signal processing. A phase rotation process for adjusting transmission timing is performed by the communication control station 400.

The entire cooperative transmission using a plurality of transmission antennas which are distant from one another can be controlled in this way by the communication control station 400. In addition to the example of FIG. 14, there may be various modifications of how to assign the processes to the communication control station 400 and the radio base stations 500 and 500a.

By adopting the mobile telecommunication system according to the third embodiment, the difference between the timings at which the mobile station 200 receives signals from a plurality of transmission antennas is controlled. This is the same with the first embodiment. That is to say, the communication control station 400 adjusts the timing of transmission by each transmission antenna included in the radio base stations 500 and 500a installed separately from the communication control station 400 so as to make the timings of receiving by the mobile station 200 as close to one another as possible. As a result, communication quality is improved.

Fourth Embodiment

A fourth embodiment will now be described. The differences between the above first embodiment and the fourth embodiment will chiefly be described and descriptions of the same items will be omitted. With a mobile telecommunication system according to the fourth embodiment a mobile station performs not only channel estimation by the use of a RS specific to a mobile station but also channel estimation by the use of a RS specific to a transmission apparatus in order to further improve receiving performance.

Figure 15:
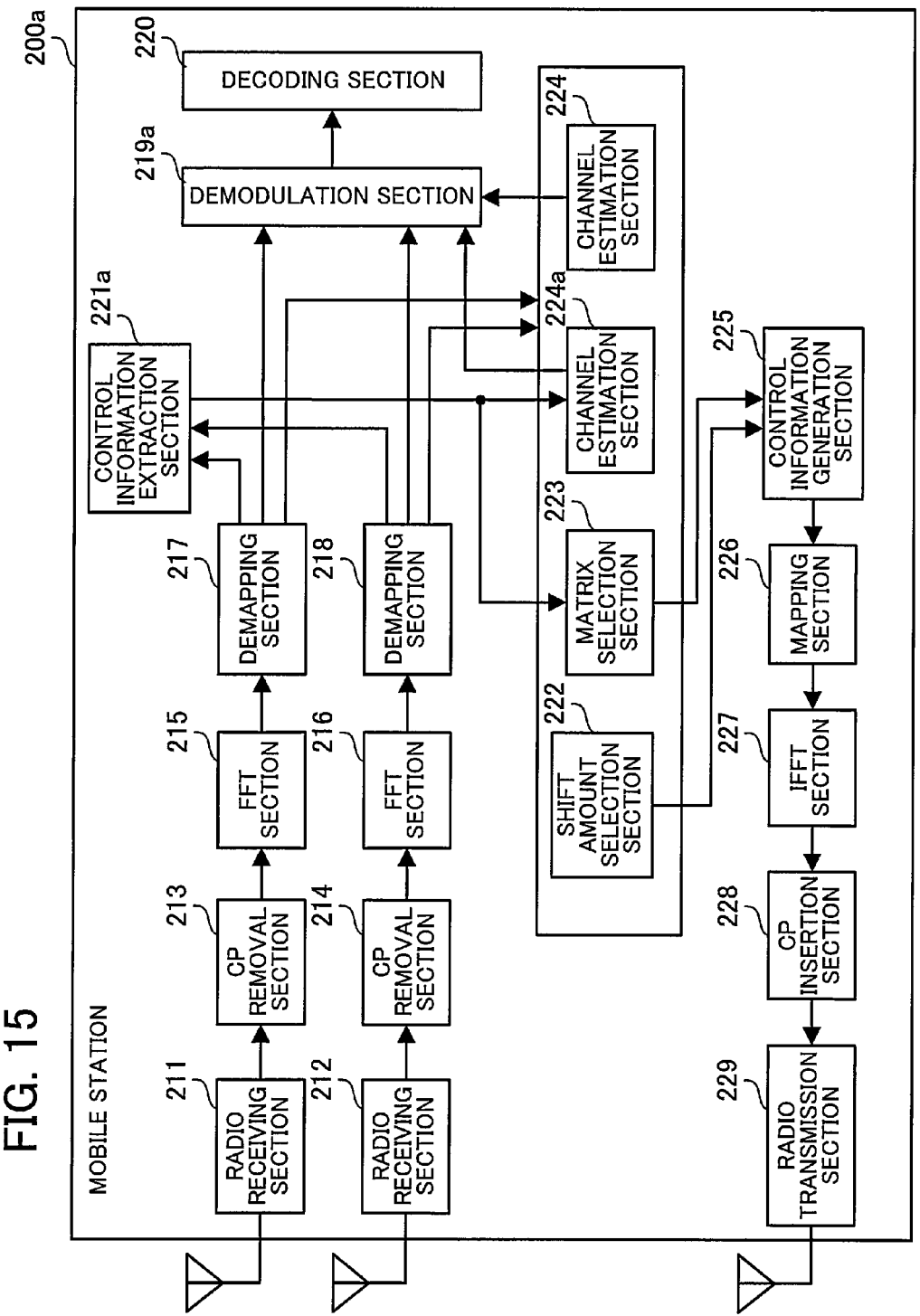
FIG. 15 is a block diagram of a mobile station in a fourth embodiment.

FIG. 15 is a block diagram of a mobile station in the fourth embodiment. A mobile station 200a is used in place of the mobile station 200 in the first embodiment. The mobile station 200a includes radio receiving sections 211 and 212, CP removal sections 213 and 214, FFT sections 215 and 216, demapping sections 217 and 218, a demodulation section 219a, a decoding section 220, a control information extraction section 221a, a shift amount selection section 222, a matrix selection section 223, channel estimation sections 224 and 224a, a control information generation section 225, a mapping section 226, an IFFT section 227, a CP insertion section 228, and a radio transmission section 229.

A process performed by a module other than the demodulation section 219a, the control information extraction section 221a, and the channel estimation section 224a is the same as that performed by the module which is included in the mobile station 200 in the first embodiment and which has the same name.

The demodulation section 219a separates modulated signals acquired from the demapping sections 217 and 218 according to transmission antenna and demodulates signals obtained. At this time the demodulation section 219a performs channel compensation not only by the use of a channel estimation value acquired from the channel estimation section 224 but also by the use of a channel estimation value acquired from the channel estimation section 224a. For example, the demodulation section 219a may perform channel compensation by the use of the average of the two channel estimation values.

The control information extraction section 221a separates and extracts determined control information from the modulated signals acquired from the demapping sections 217 and 218. The extracted control information includes information indicative of a circular shift amount determined by a radio base station 100 and information indicative of a precoding matrix. The control information extraction section 221a then informs the matrix selection section 223 and the channel estimation section 224a of the circular shift amount and informs the channel estimation section 224a of the precoding matrix.

The channel estimation section 224a performs channel estimation by the use of a RS specific to a transmission apparatus acquired from the demapping sections 217 and 218 and the circular shift amount and the precoding matrix of which the control information extraction section 221a informs the channel estimation section 224a.

That is to say, first the channel estimation section 224a performs channel estimation by the use of the RS specific to the transmission apparatus which is a known signal on which precoding or phase rotation has not been performed. The channel estimation section 224a then calculates a channel estimation value after precoding by the matrix product of a channel estimation value matrix obtained, a phase rotation matrix, and a precoding matrix. The channel estimation section 224a outputs the channel estimation value to the demodulation section 219a. This is the same with the channel estimation section 224.

By adopting the mobile telecommunication system according to the fourth embodiment, the difference between the timings at which the mobile station 200a receives signals from a plurality of transmission antennas is controlled. This is the same with the first embodiment. In addition, by performing both channel estimation by the use of a known signal on which precoding and phase rotation have been performed and channel estimation by the use of a known signal on which precoding or phase rotation has not been performed, accuracy in channel estimation is improved further. As a result, communication quality is improved further.

Fifth Embodiment

A fifth embodiment will now be described. The differences between the above first embodiment and the fifth embodiment will chiefly be described and descriptions of the same items will be omitted. With a mobile telecommunication system according to the fifth embodiment the range of one change in circular shift amount at the beginning of cooperative transmission differs from the range of one change in circular shift amount after the beginning of cooperative transmission. For example, one possible method is to make the range of one change in circular shift amount at the beginning of cooperative transmission wide and to make the range of one change in circular shift amount at update time after the beginning of cooperative transmission narrow. The reason for this is that there may be a great receiving timing difference at the beginning of cooperative transmission and that in many cases, a receiving timing difference fluctuates little by little after the beginning of cooperative transmission.

Figure 16:
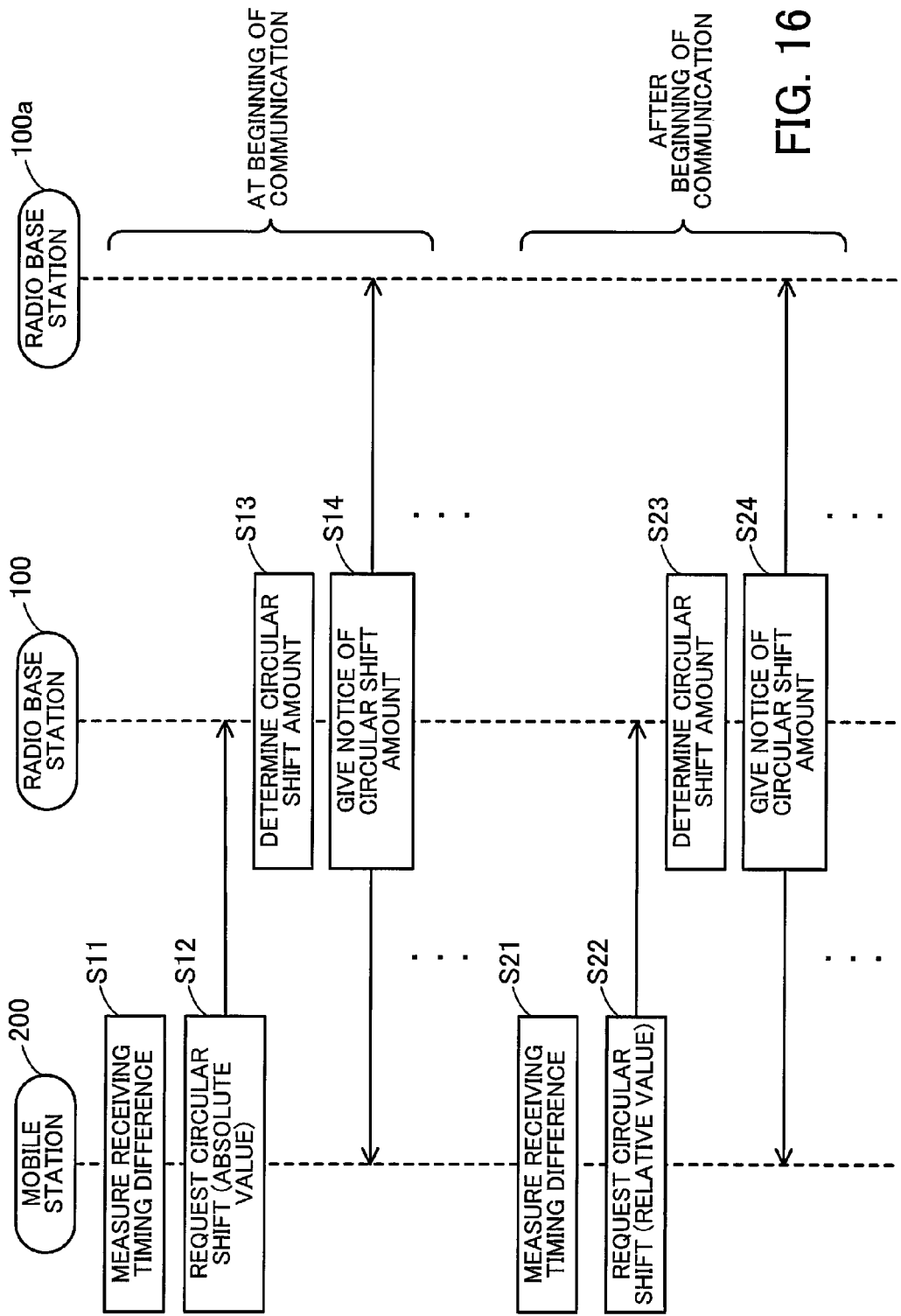
FIG. 16 is a flow chart of another example of downlink communication control.

FIG. 16 is a flow chart of another example of downlink communication control. Steps S11 through S14 are described in the first embodiment. Control information transmitted from a mobile station 200 to a radio base station 100 in step S12 indicates the absolute value (sample number) of a receiving timing difference. The following steps S21 through S24 are performed after steps S11 through S14.

(Step S21) The mobile station 200 uses a RS specific to a transmission apparatus outputted from each transmission antenna included in the radio base stations 100 and 100a for measuring a receiving timing difference for a signal from each transmission antenna.

(Step S22) The mobile station 200 compares the receiving timing difference measured in step S21 with a current circular shift amount (receiving timing difference measured the last time in step S11) and calculates the amount of a change in receiving timing difference (relative value of a circular shift amount). The mobile station 200 then transmits control information indicative of the amount of the change in receiving timing difference to the radio base station 100.

(Step S23) The radio base station 100 receives the control information which the mobile station 200 transmits in step S22, and updates a circular shift amount applied to a signal transmitted from each transmission antenna included in the radio base stations 100 and 100a on the basis of the relative value indicated by the control information.

(Step S24) The radio base station 100 transmits control information indicative of a circular shift amount after the update in step S23 to the mobile station 200. In addition, the radio base station 100 gives notice of the circular shift amount after the update to the radio base station 100a which performs cooperative transmission via the network 10.

The mobile station 200 can express the absolute value in step S12 and the relative value in step S22 by bit strings with the same bit length. In this case, a circular shift amount at the beginning of cooperative transmission and a circular shift amount after the beginning of cooperative transmission which the same bit string means differ. As a result, the mobile station 200 can perform feedback efficiently by a limited number of bits.

By adopting the mobile telecommunication system according to the fifth embodiment, the difference between the timings at which the mobile station 200 receives signals from a plurality of transmission antennas is controlled and communication quality is improved. This is the same with the first embodiment. In addition, the amount of control information used for feedback from the mobile station 200 to the radio base station 100 can be reduced and overhead which results from control information transmission can be controlled.

Sixth Embodiment

A sixth embodiment will now be described. With a mobile telecommunication system according to the sixth embodiment the range of one change in circular shift amount can be changed more flexibly. To be concrete, an upper layer such as a RRC (Radio Resource Control) layer informs a physical layer of the granularity of a bit string transmitted from a mobile station 200 to a radio base station 100, that is to say, the number of samples corresponding to a difference of one bit.

For example, a bit string indicative of a circular shift amount is fixed at 5 bits (−16 to +15) by which a binary number is expressed as the two's complement. On the other hand, the granularity is selected from 4, 2, 1, and 0.5 microseconds. In this case, the range of one change in circular shift amount can be set to −64 to +60 microseconds, −32 to +30 microseconds, −16 to +15 microseconds, or −8 to +7.5 microseconds. For example, the radio base station 100 may set the granularity and inform the mobile station 200 of it via a broadcast channel.

By adopting the mobile telecommunication system according to the sixth embodiment, a balance between a reduction in the amount of control information and accuracy in compensating for a receiving timing difference can be achieved and the receiving timing difference can be controlled efficiently.

Seventh Embodiment

A seventh embodiment will now be described. With a mobile telecommunication system according to the seventh embodiment a circular shift amount can be controlled at a high speed so that instantaneous fading can be tracked flexibly. To be concrete, first a mobile station 200 measures a delay profile for each transmission antenna by the use of a RS specific to a transmission apparatus. The delay profile may indicate the result of instantaneous measurement or be an average in a determined short interval.

The mobile station 200 then selects a transmission antenna for which the total of path receiving power is the largest as a transmission antenna used as reference for estimating a receiving timing difference. Furthermore, the mobile station 200 specifies the timing of a path (largest receiving power path) of each transmission antenna for which receiving power is the largest, and considers the difference in timing between the reference transmission antenna and the largest receiving power path as a receiving timing difference.

By adopting the mobile telecommunication system according to the seventh embodiment, a receiving timing difference can be measured at a high speed and instantaneous fading can be tracked flexibly.

Eighth Embodiment

An eighth embodiment will now be described. With a mobile telecommunication system according to the eighth embodiment a circular shift amount can be controlled at a high speed by a method different from the method in the seventh embodiment. To be concrete, first a mobile station 200 measures a delay profile for each transmission antenna by the use of a RS specific to a transmission apparatus. The mobile station 200 then estimates a path centroid for each transmission antenna weighted by receiving power. Furthermore, the mobile station 200 sets a central path of a signal from a transmission antenna of a serving base station (radio base station 100, for example) as reference timing and estimates a receiving timing difference for another transmission antenna.

By adopting the mobile telecommunication system according to the eighth embodiment, a receiving timing difference can be measured at a high speed and instantaneous fading can be tracked flexibly. This is the same with the seventh embodiment.

Ninth Embodiment

A ninth embodiment will now be described. With a mobile telecommunication system according to the ninth embodiment both a circular shift amount and a precoding matrix can be determined at a high speed. To be concrete, a mobile station 200 estimates in advance a precoding matrix which maximizes SNR (Signal-to-Noise Ratio) after precoding for each candidate circular shift amount (receiving timing difference). That is to say, the mobile station 200 estimates in advance the most suitable combination of a circular shift amount and a precoding matrix.

As a result, when the mobile station 200 measures a receiving timing difference, a suitable precoding matrix corresponding to the receiving timing difference is also specified simultaneously. As the range of candidate circular shift amounts widens, the processing load on the mobile station 200 becomes heavier. Accordingly, it is desirable that the range of candidate circular shift amounts set should be made as narrow as possible with a processing amount which can be allowed by the mobile station 200, the maximum receiving timing difference which may arise in the mobile telecommunication system, and the like taken into consideration. Alternatively, a radio base station 100 may inform the mobile station 200 of the range of candidate circular shift amounts.

By adopting the mobile telecommunication system according to the ninth embodiment, both a circular shift amount and a precoding matrix can be determined simultaneously and communication control overhead can be reduced.

Tenth Embodiment

A tenth embodiment will now be described. With a mobile telecommunication system according to the tenth embodiment a receiving timing difference is allowed to a certain extent by a mobile station 200. To be concrete, first the mobile station 200 measures a receiving timing difference for a signal from each transmission antenna. The mobile station 200 then determines whether or not the receiving timing difference is greater than a determined threshold.

If the receiving timing difference is greater than the determined threshold, then the mobile station 200 gives a radio base station 100 event notice to that effect. When the radio base station 100 receives the event notice, the radio base station 100 requests the mobile station 200 to report the receiving timing difference (desired circular shift amount). When the mobile station 200 receives this request from the radio base station 100, the mobile station 200 transmits the receiving timing difference (desired circular shift amount). However, the mobile station 200 may give the event notice and a report of the receiving timing difference at the same time.

On the other hand, if the receiving timing difference is not greater than the determined threshold, the mobile station 200 does not report the receiving timing difference to the radio base station 100. That is to say, the mobile station 200 allows a receiving timing difference to a certain extent. Only if a receiving timing difference is sufficiently large, the mobile station 200 requests the radio base station 100 to change transmission timing.

By adopting the mobile telecommunication system according to the tenth embodiment, a receiving timing difference compensation process is performed only if a receiving timing difference has a great influence on communication quality at the mobile station 200. As a result, the processing loads on the radio base station 100, a radio base station 100a, and the mobile station 200 are reduced.

According to the above communication apparatus, mobile station, and communication control method, receiving quality is improved in the case of receiving signals each including the same data from a plurality of transmission antennas.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A communication apparatus which transmits signals each including same data from a plurality of transmission antennas to a mobile station, the communication apparatus comprising:
    a receiver which acquires information indicative of a difference in receiving timing at the mobile station between a first signal from a first transmission antenna and a second signal from a second transmission antenna; and
    a processor which controls transmission of the second signal according to the difference in receiving timing so that the second signal in a determined interval is circular-shifted within the determined interval, wherein:
    the information indicative of the difference in receiving timing is transmitted from the mobile station when the difference measured by the mobile station exceeds a threshold; and
    the information indicative of the difference in receiving timing is not transmitted from the mobile station when the difference measured by the mobile station is equal to or lower than the threshold.

2. The communication apparatus according to claim 1 further comprising a transmitter which phase-rotates the second signal on a frequency domain under the control of the processor.

3. The communication apparatus according to claim 1 further comprising a transmitter which circular-shifts the second signal on a time domain under the control of the processor.

4. The communication apparatus according to claim 1, wherein the processor limits an amount of circular-shift of the second signal according to a communication state of the mobile station.

5. The communication apparatus according to claim 1 further comprising a transmitter which OFDM-modulates the first and second signals, wherein the determined interval corresponds to an OFDM symbol.

6. A mobile station for communicating with a radio communication system which transmits signals each including same data from a plurality of transmission antennas, the mobile station comprising:
    a first processor which measures a difference in receiving timing between a first signal from a first transmission antenna and a second signal from a second transmission antenna;
    a transmitter which transmits to the radio communication system, information indicative of the difference in receiving timing measured by the first processor; and
    a second processor which combines and demodulates the first signal from the first transmission antenna and the second signal from the second transmission antenna after the transmitter transmits the information indicative of the difference in receiving timing, wherein:
    the transmitter transmits the information indicative of the difference in receiving timing when the measured difference exceeds a threshold;
    the transmitter does not transmit the information indicative of the difference in receiving timing when the measured difference is equal to or lower than the threshold; and
    the second signal in a determined interval is circular-shifted within the determined interval according to the difference in receiving timing.

7. The mobile station according to claim 6, wherein the first processor uses receiving power of the first signal and the second signal for selecting the first transmission antenna from among the plurality of transmission antennas as reference for estimating the difference in receiving timing.

8. The mobile station according to claim 6, wherein:
    the first processor selects precoding matrices to be applied to the first transmission antenna and the second transmission antenna from among a plurality of candidate precoding matrices by the use of the difference in receiving timing; and
    the transmitter transmits the precoding matrices selected by the first processor.

9. The mobile station according to claim 6, wherein the transmitter transmits a bit string with determined bit length corresponding to the difference in receiving timing as the information indicative of the difference in receiving timing.

10. The mobile station according to claim 6, wherein:
    the mobile station receives an OFDM-modulated signal; and
    the first processor uses an OFDM symbol including a known signal for measuring the difference in receiving timing in the OFDM symbol.

11. A communication control method for a radio communication system which transmits signals each including same data from a plurality of transmission antennas to a mobile station, the communication control method comprising:
    acquiring information indicative of a difference in receiving timing at the mobile station between a first signal from a first transmission antenna and a second signal from a second transmission antenna from the mobile station; and
    controlling transmission of the second signal according to the difference in receiving timing so that the second signal in a determined interval is circular-shifted within the determined interval, wherein:
    the information indicative of the difference in receiving timing is transmitted from the mobile station when the difference measured by the mobile station exceeds a threshold; and
    the information indicative of the difference in receiving timing is not transmitted from the mobile station when the difference measured by the mobile station is equal to or lower than the threshold.

* * * * *